US012800886B2

(12) United States Patent
Yamada et al.

(10) Patent No.: US 12,800,886 B2
(45) Date of Patent: Nov. 17, 2026

(54) ZOOM LENS AND IMAGE PICKUP APPARATUS

(71) Applicant: CANON KABUSHIKI KAISHA, Tokyo (JP)

(72) Inventors: Tomoya Yamada, Saitama (JP); Yutaka Iriyama, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 195 days.

(21) Appl. No.: 18/731,492

(22) Filed: Jun. 3, 2024

(65) Prior Publication Data

US 2025/0035896 A1 Jan. 30, 2025

(30) Foreign Application Priority Data

Jul. 5, 2023 (JP) ................................. 2023-110443

(51) Int. Cl.
*G02B 13/02* (2006.01)
*G02B 13/00* (2006.01)
*G02B 15/14* (2006.01)

(52) U.S. Cl.
CPC ......... *G02B 13/02* (2013.01); *G02B 13/0045* (2013.01); *G02B 13/009* (2013.01); *G02B 15/145129* (2019.08)

(58) Field of Classification Search
CPC .. G02B 13/02; G02B 13/0045; G02B 13/009; G02B 15/145129; G02B 15/20
See application file for complete search history.

(56) References Cited

U.S. PATENT DOCUMENTS

| | | | |
|---|---|---|---|
| 9,402,031 | B2 | 7/2016 | Iriyama |
| 9,648,244 | B2 | 5/2017 | Iriyama |
| 9,897,803 | B2 | 2/2018 | Yamada |
| 10,401,600 | B2 | 9/2019 | Iriyama |
| 10,551,599 | B2 | 2/2020 | Yamada |
| 11,061,212 | B2 | 7/2021 | Yamada |
| 11,307,400 | B2 | 4/2022 | Yamada |
| 11,428,912 | B2 | 8/2022 | Iriyama |
| 2016/0124199 | A1 | 5/2016 | Iriyama |

(Continued)

FOREIGN PATENT DOCUMENTS

JP 2021-032924 A 3/2021

OTHER PUBLICATIONS

Hecht Optics (Hecht, Eugene. Optics, Fourth Edition, Addison Wesley, San Francisco, CA, U.S.A., 2002, pp. 243-246) (Year: 2002).*

*Primary Examiner* — Christina Y. Leung
(74) *Attorney, Agent, or Firm* — Carter, DeLuca & Farrell LLP

(57) ABSTRACT

A zoom lens includes, in order from an object side to an image side, a first lens unit having positive refractive power that does not move for zooming, three or more intermediate lens units that move for zooming, and a rear lens unit having positive refractive power. A distance between adjacent lens units changes during zooming. The first lens unit includes, in order from the object side to the image side, a first sub-lens unit having negative refractive power that does not move for focusing, a second sub-lens unit having positive refractive power that moves for focusing, and a third sub-lens unit having positive refractive power. Predetermined inequalities are satisfied.

13 Claims, 14 Drawing Sheets

(56) References Cited

U.S. PATENT DOCUMENTS

| | | | | |
|---|---|---|---|---|
| 2021/0405336 | A1* | 12/2021 | Yamada | G02B 15/145125 |
| 2023/0350168 | A1 | 11/2023 | Yamada | |
| 2023/0350173 | A1 | 11/2023 | Yamada | |
| 2024/0053592 | A1 | 2/2024 | Yamada | |
| 2024/0385419 | A1 | 11/2024 | Ogawa | |

* cited by examiner

ZOOM LENS AND IMAGE PICKUP APPARATUS

BACKGROUND

Technical Field

One of the aspects of the embodiments relates to a zoom lens.

Description of Related Art

Zoom lenses used in image pickup apparatuses such as television cameras, movie cameras, digital still cameras, and video cameras are demanded to have a reduced size and weight, a wide angle of view, a high magnification varying ratio, and high optical performance, such as high resolution and low chromatic aberration from the optical axis center to the periphery.

Japanese Patent Laid-Open No. 2021-032924 discloses a zoom lens that includes, in order from the object side to the image side, a first lens unit having positive refractive power that does not move for zooming, three or more intermediate lenses that move for zooming that move for zooming, and a rear lens unit having positive refractive power that does not move for zooming.

In the zoom lens disclosed in Japanese Patent Laid-Open No. 2021-032924, in an attempt for a wider angle of view and a higher magnification varying ratio, the diameter of the first lens unit and the size of the zoom lens increase.

SUMMARY

A zoom lens according to one aspect of the disclosure includes, in order from an object side to an image side, a first lens unit having positive refractive power that does not move for zooming, three or more intermediate lens units that move for zooming, and a rear lens unit having positive refractive power. A distance between adjacent lens units changes during zooming. The first lens unit includes, in order from the object side to the image side, a first sub-lens unit having negative refractive power that does not move for focusing, a second sub-lens unit having positive refractive power that moves for focusing, and a third sub-lens unit having positive refractive power. The following inequalities are satisfied:

$$2.430 \leq (f1 + bok1)/f1 \leq 4.500$$

$$1.150 \leq ft/f1 \leq 3.200$$

$$2.250 \leq f1/fw \leq 6.700$$

where f1 is a focal length of the first lens unit, bok1 is a length on an optical axis from a lens surface closest to an image plane of the first lens unit to a rear principal point of the first lens unit in an in-focus state on an infinity object, fw is a focal length of the zoom lens at a wide-angle end, and ft is a focal length of the zoom lens at a telephoto end. The zoom lens is used for an image pickup apparatus having an imaging surface with a diagonal size of 2Y, and the following inequality is satisfied:

$$51.50° \leq \omega w \leq 65.00°$$

where ωw is a half angle of the zoom lens at the wide-angle end and defined as:

$$\omega w = \arctan(Y/fw).$$

An image pickup apparatus having the above zoom lens also constitutes another aspect of the disclosure.

A zoom lens according to another aspect of the disclosure includes, in order from an object side to an image side, a first lens unit having positive refractive power that does not move for zooming, three or more intermediate lens units that move for zooming, an aperture stop, and a rear lens unit having positive refractive power. A distance between adjacent lens units changes during zooming. The aperture stop is disposed within or adjacent to any one of the three or more intermediate lens units, and configured to move together with the any one of the intermediate lens units during zooming. The first lens unit includes, in order from the object side to the image side, a first sub-lens unit having negative refractive power that does not move for focusing, a second sub-lens unit having positive refractive power that moves for focusing, and a third sub-lens unit having positive refractive power. The following inequalities are satisfied:

$$2.000 \leq (f1 + bok1)/f1 \leq 4.500$$

$$1.950 \leq ft/f1 \leq 3.200$$

where f1 is a focal length of the first lens unit, bok1 is a length on an optical axis from a lens surface closest to an image plane of the first lens unit to a rear principal point of the first lens unit in an in-focus state on an infinity object, and ft is a focal length of the zoom lens at a telephoto end. An image pickup apparatus having the above zoom lens also constitutes another aspect of the disclosure.

Further features of various embodiments of the disclosure will become apparent from the following description of embodiments with reference to the attached drawings.

12A and 12B are aberration diagrams of the zoom lens according to Example 6 at the wide-angle end and telephoto end.

Figure 1:
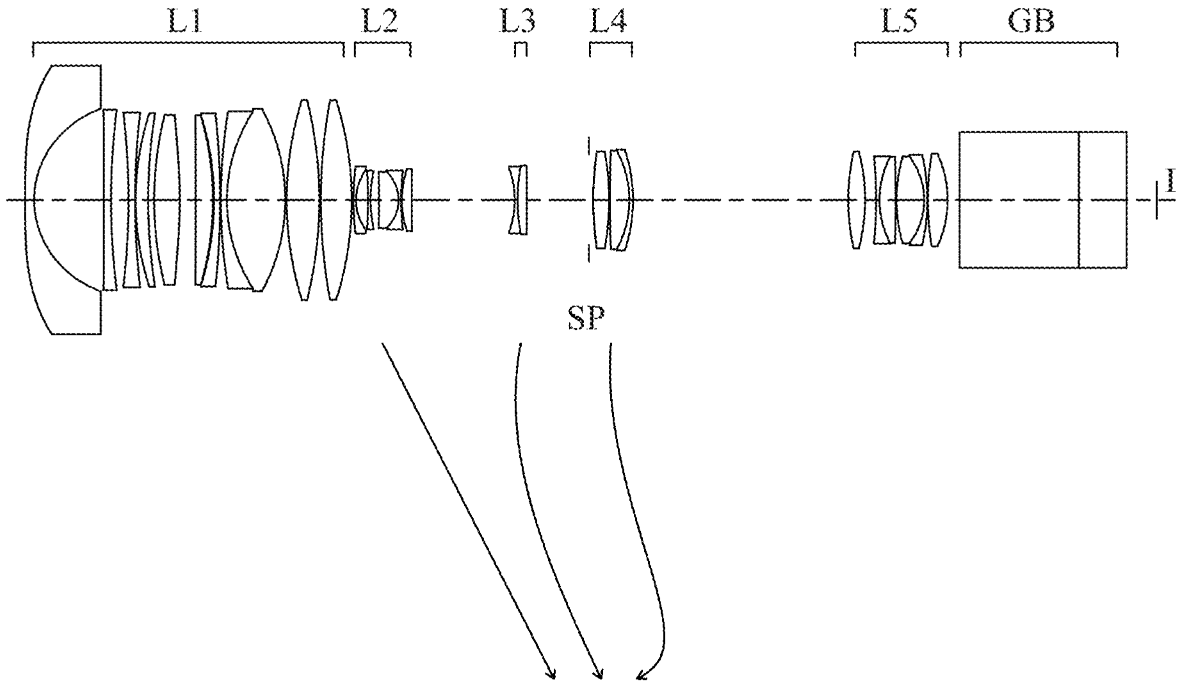
FIG. 1 is a sectional view of a zoom lens according to Example 1 at a wide-angle end.
Figure 2A:
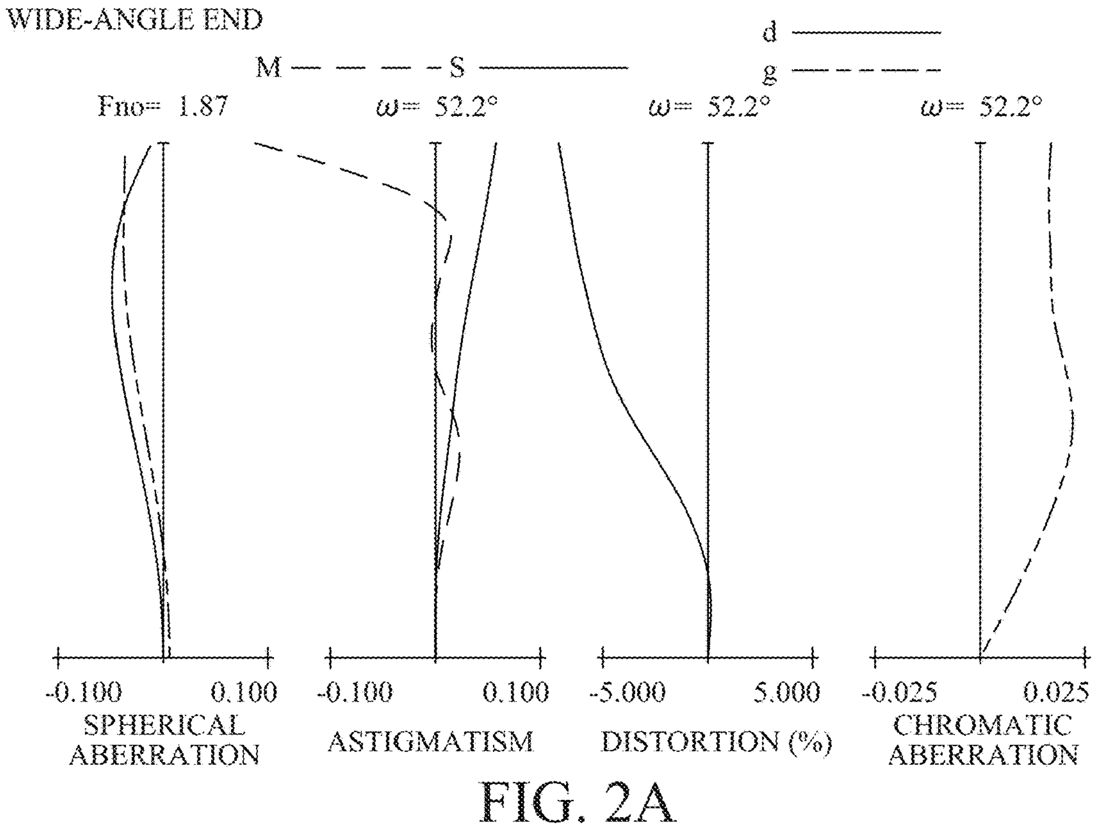
FIGS. 2A and 2B are aberration diagrams of the zoom lens according to Example 1 at the wide-angle end and a telephoto end.
Figure 2B:
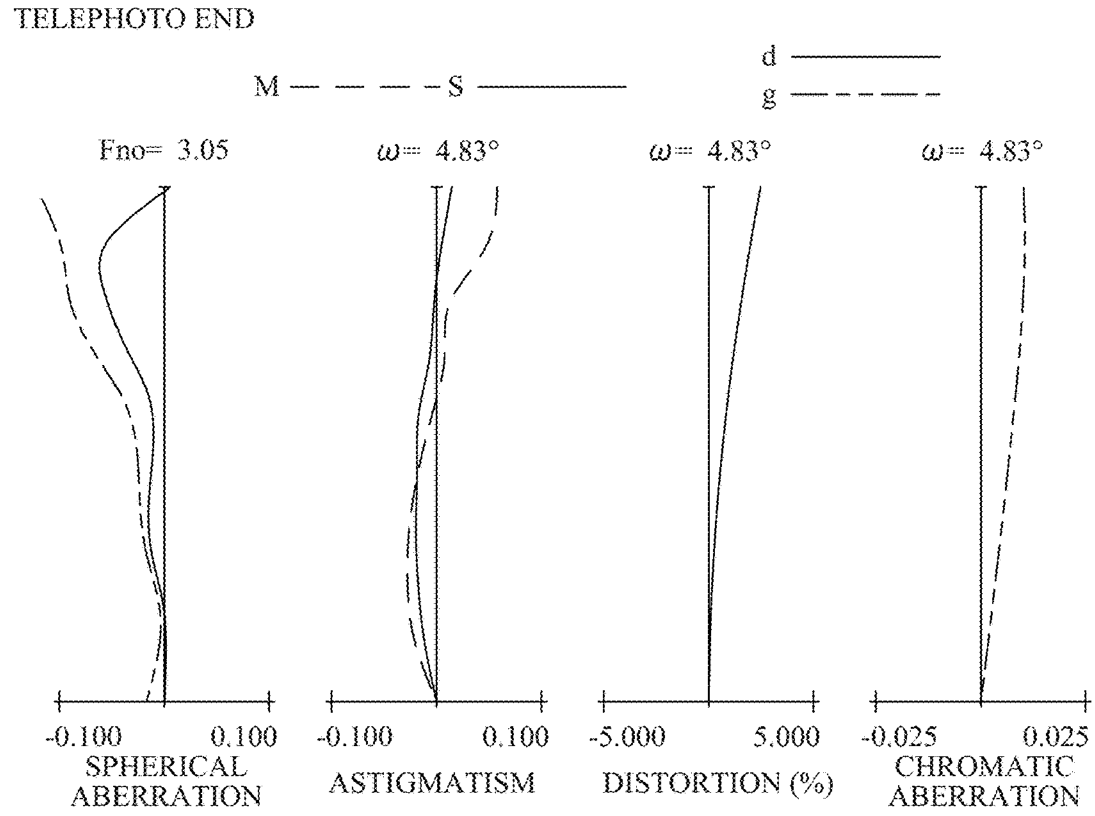
Figure 3:
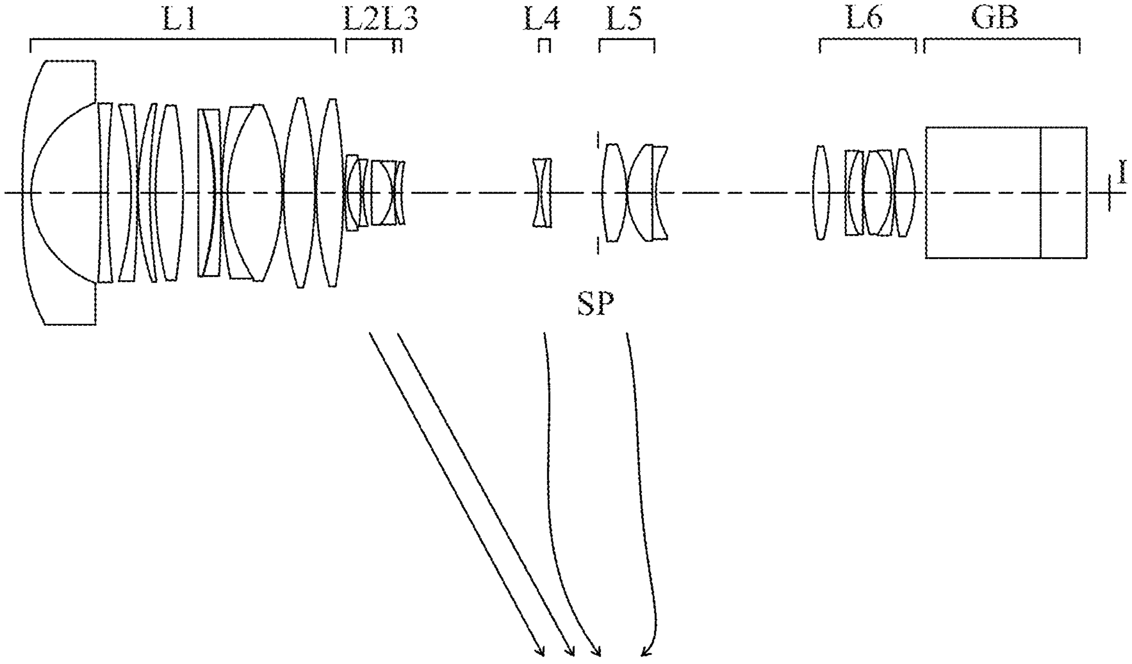
FIG. 3 is a sectional view of a zoom lens according to Example 2 at a wide-angle end.
Figure 4A:
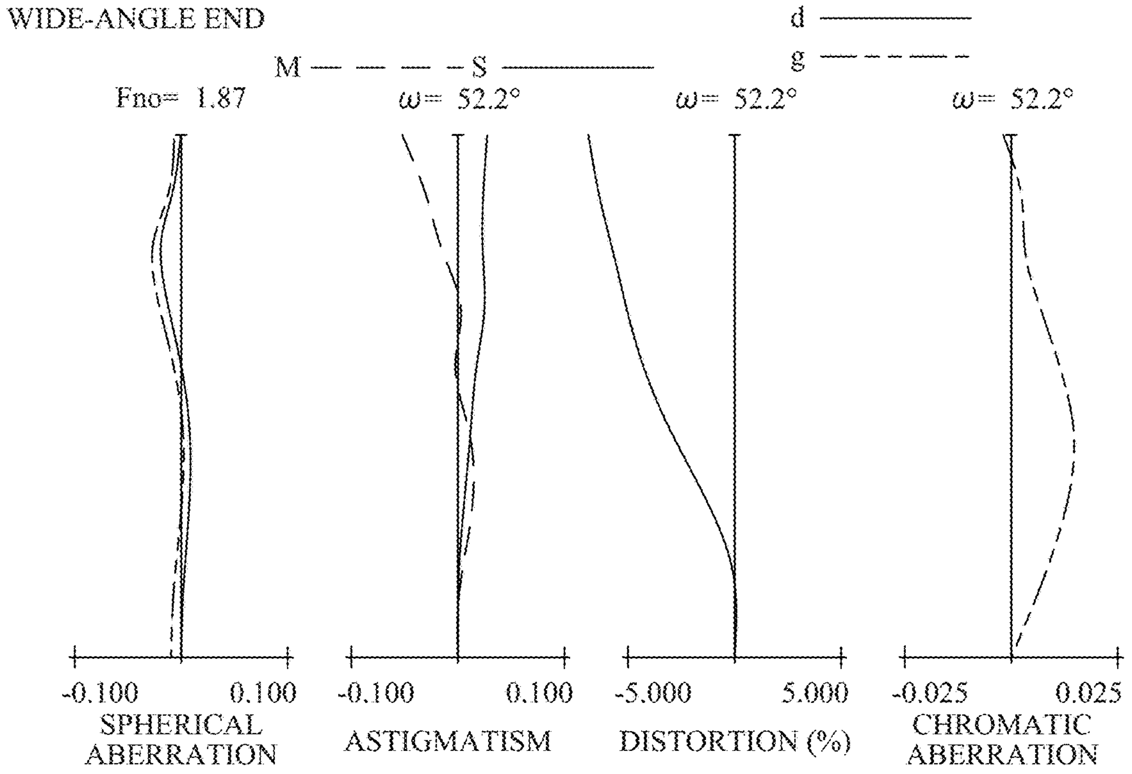
FIGS. 4A and 4B are aberration diagrams of the zoom lens according to Example 2 at the wide-angle end and a telephoto end.
Figure 4B:
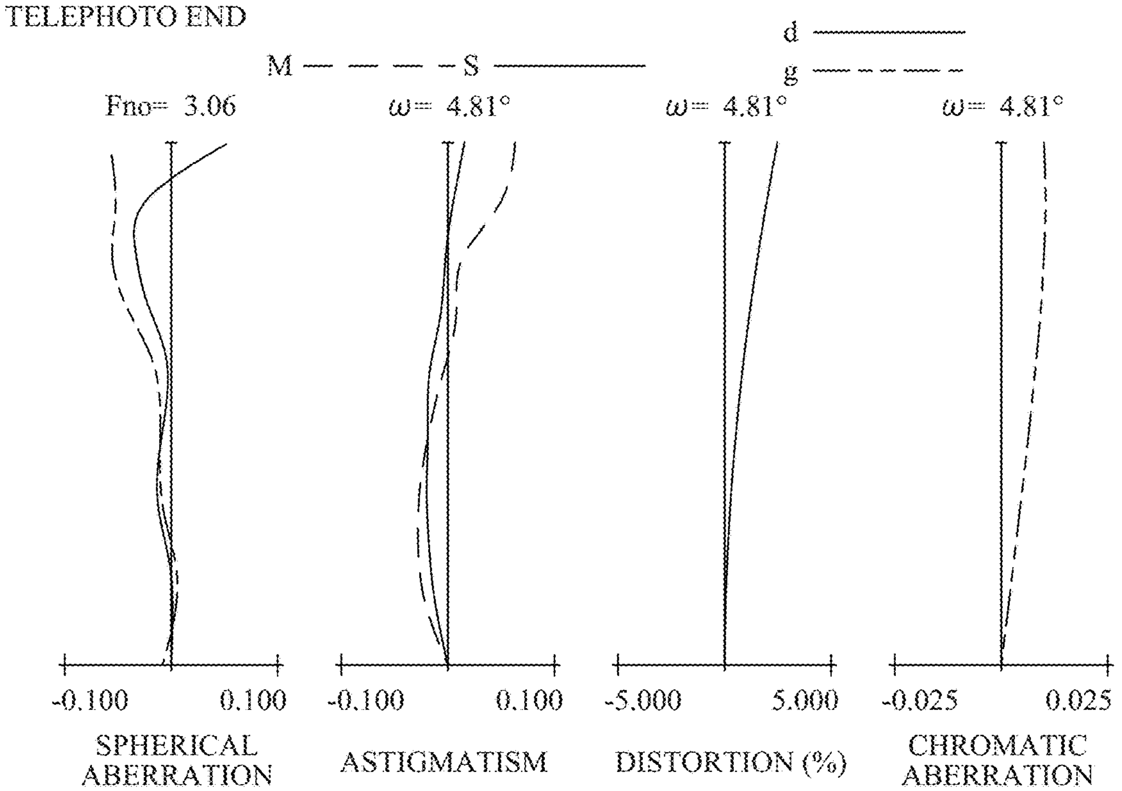
Figure 5:
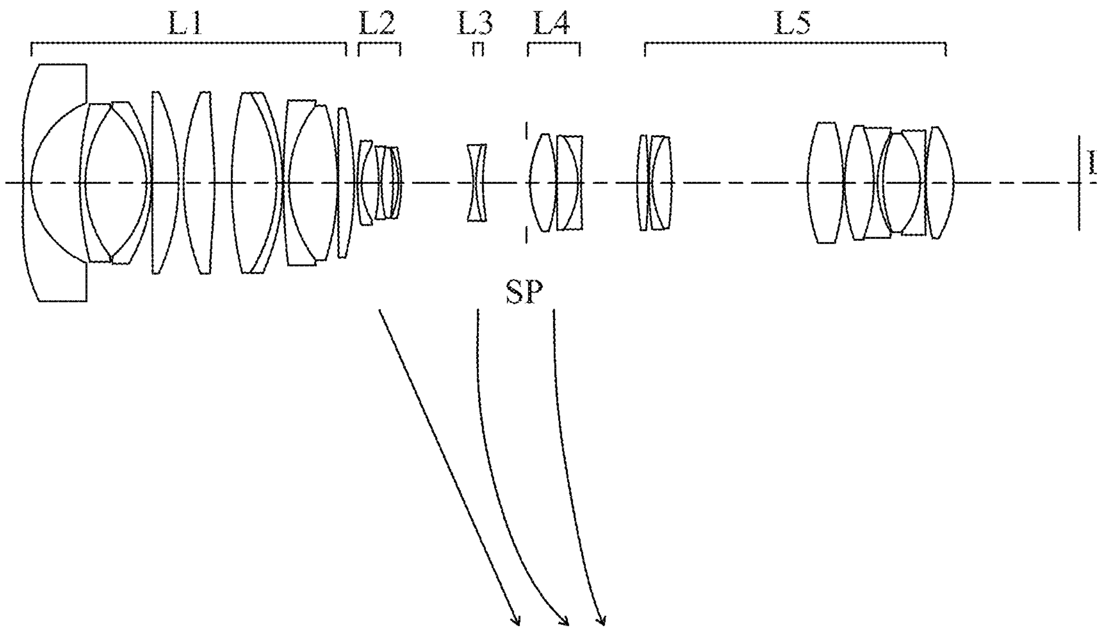
FIG. 5 is a sectional view of a zoom lens according to Example 3 at a wide-angle end.
Figure 6A:
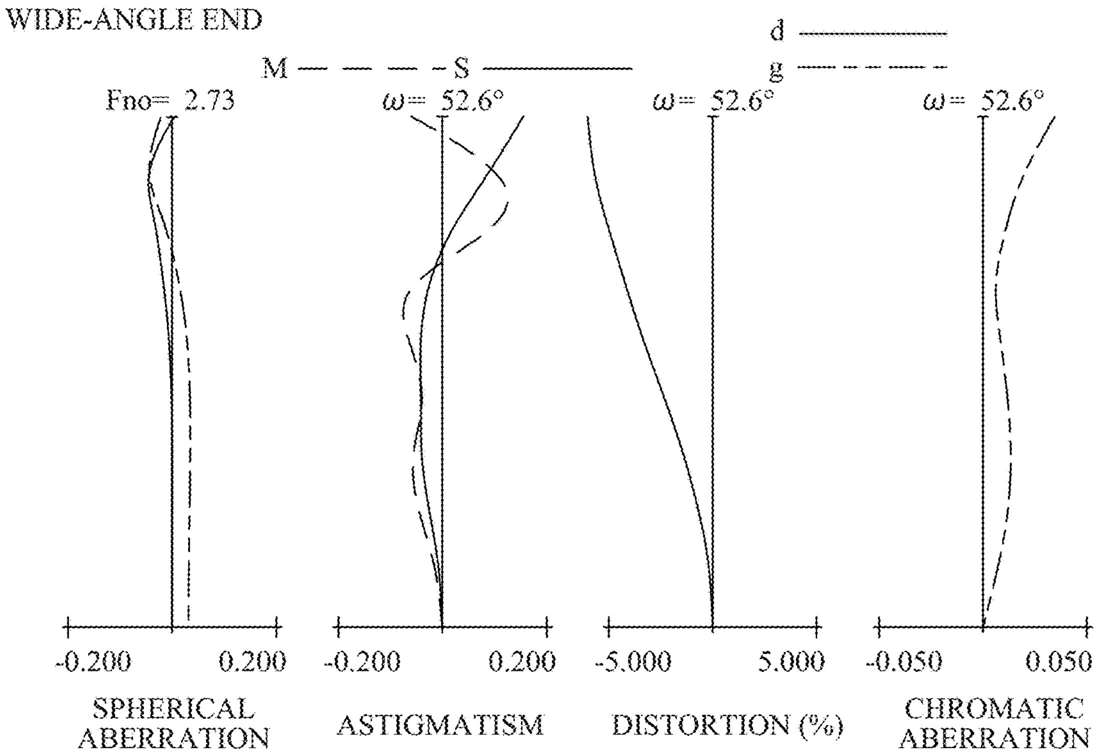
FIGS. 6A and 6B are aberration diagrams of the zoom lens according to Example 3 at the wide-angle end and a telephoto end.
Figure 6B:
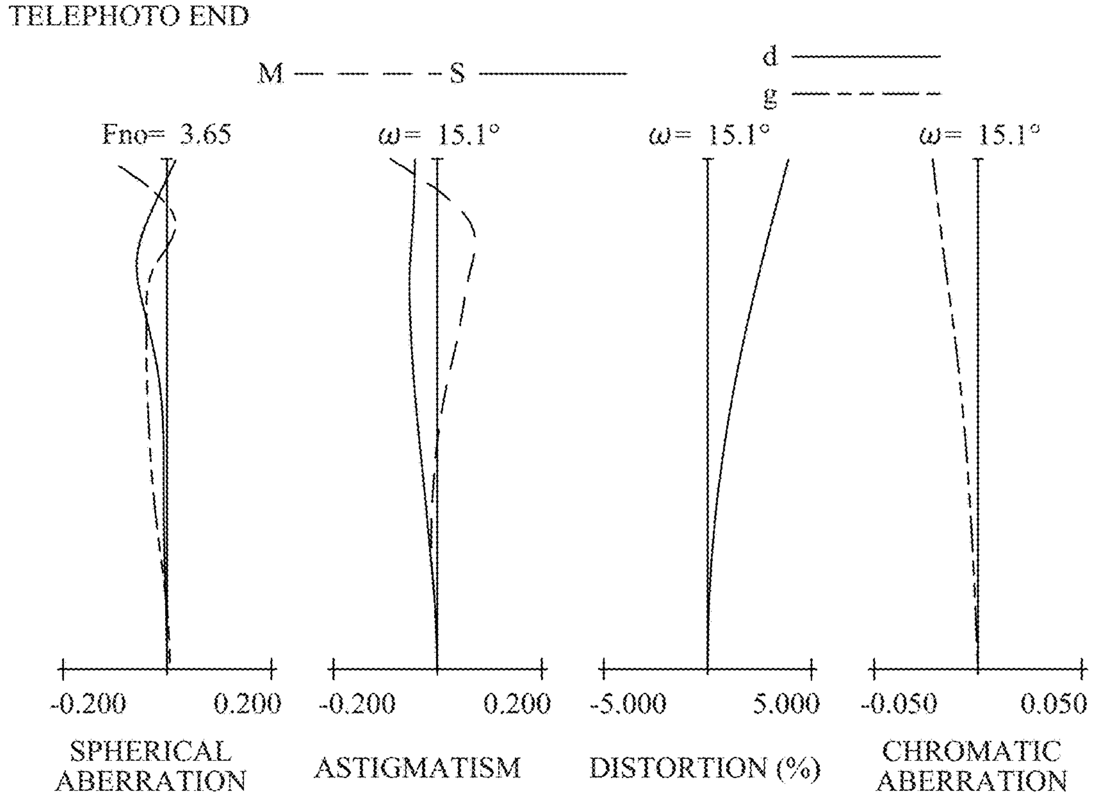
Figure 7:
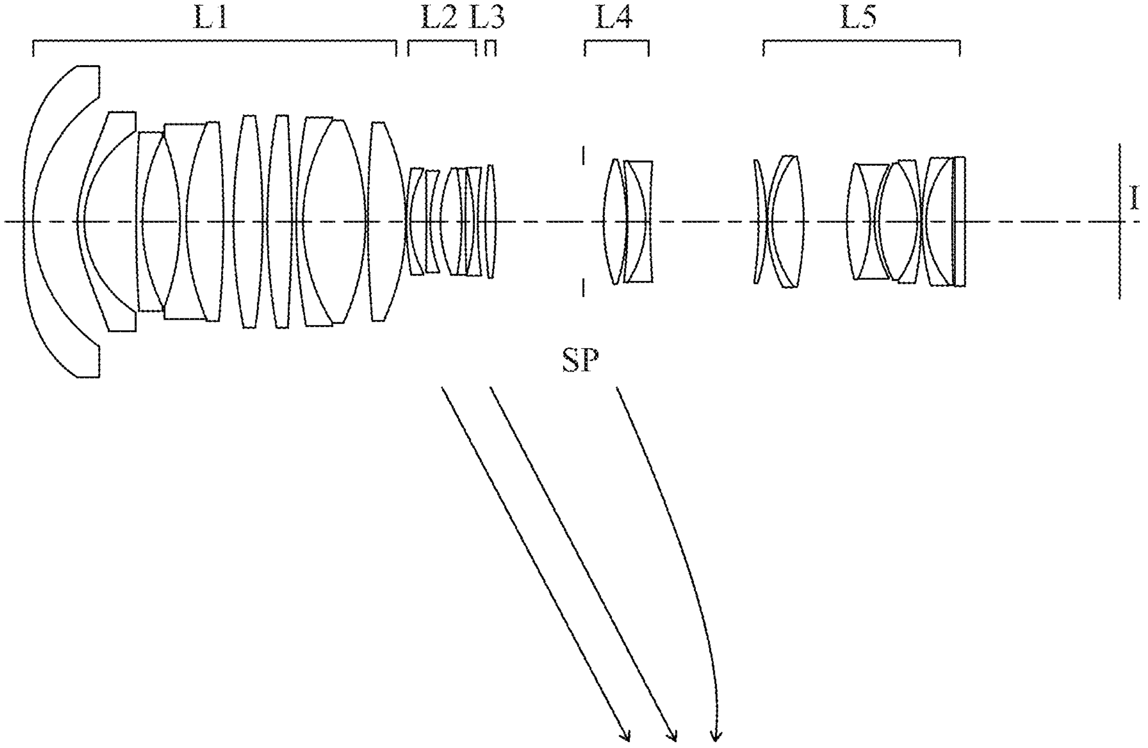
FIG. 7 is a sectional view of a zoom lens according to Example 4 at a wide-angle end.
Figure 8A:
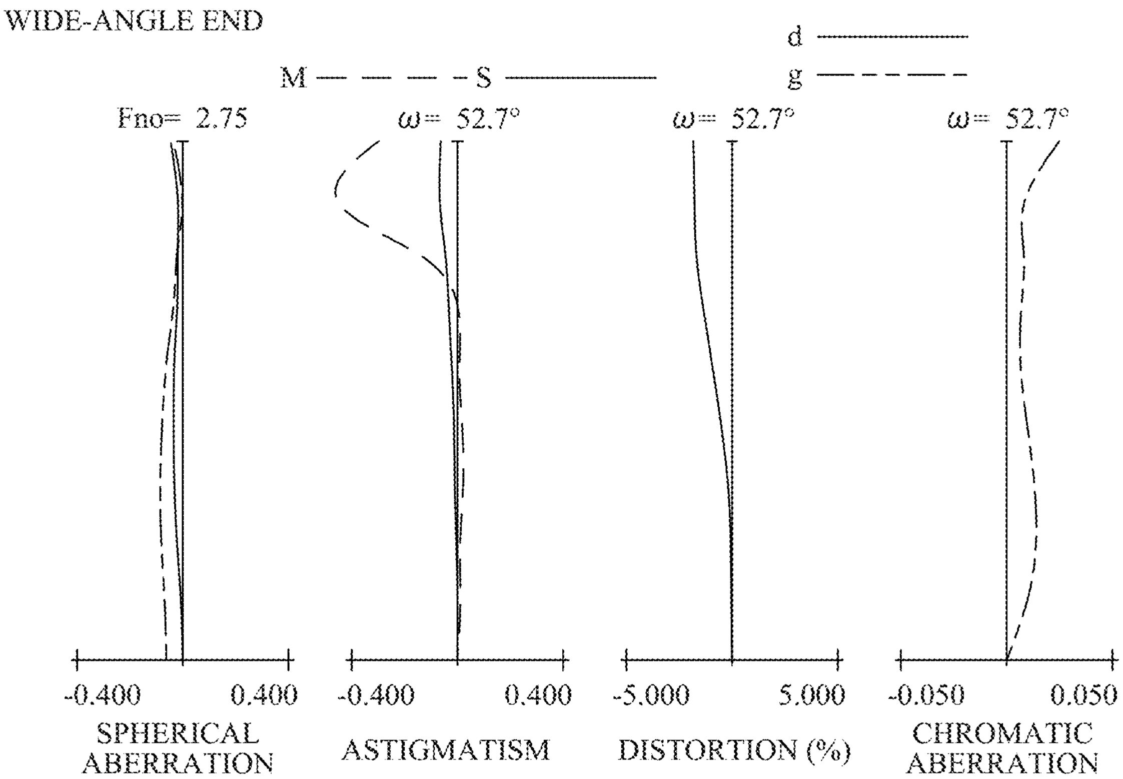
FIGS. 8A and 8B are aberration diagrams of the zoom lens according to Example 4 at the wide-angle end and a telephoto end.
Figure 8B:
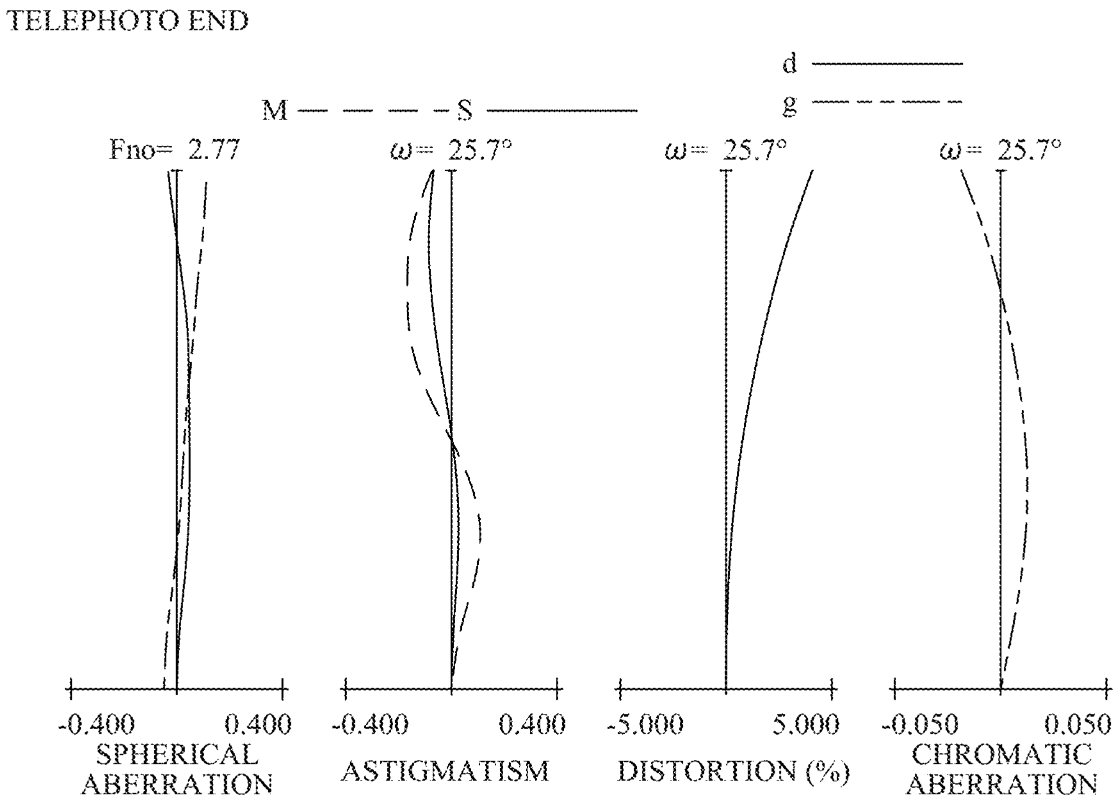
Figure 9:
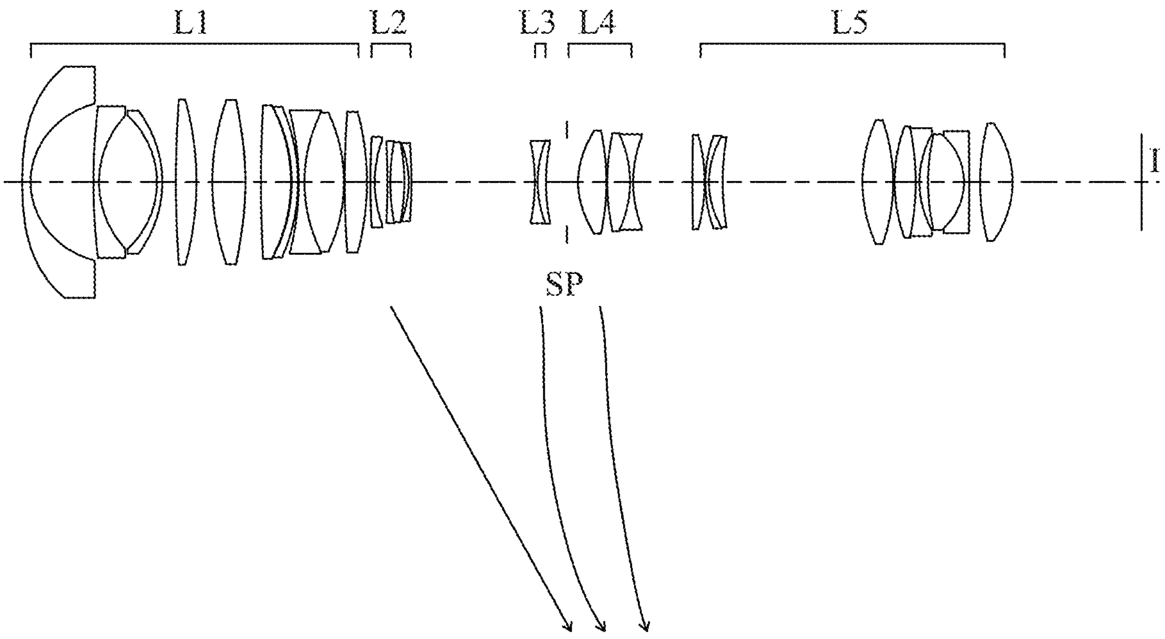
FIG. 9 is a sectional view of a zoom lens according to Example 5 at a wide-angle end.
Figure 10A:
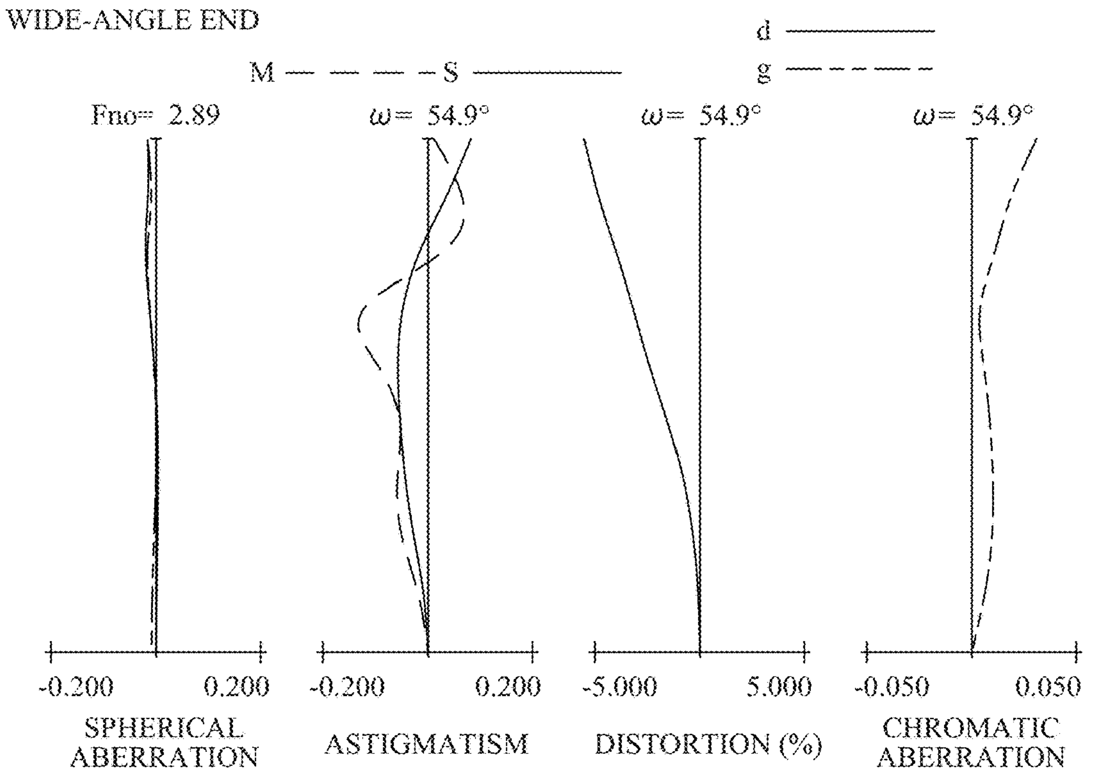
FIGS. 10A and 10B are aberration diagrams of the zoom lens according to Example 5 at the wide-angle end and a telephoto end.
Figure 10B:
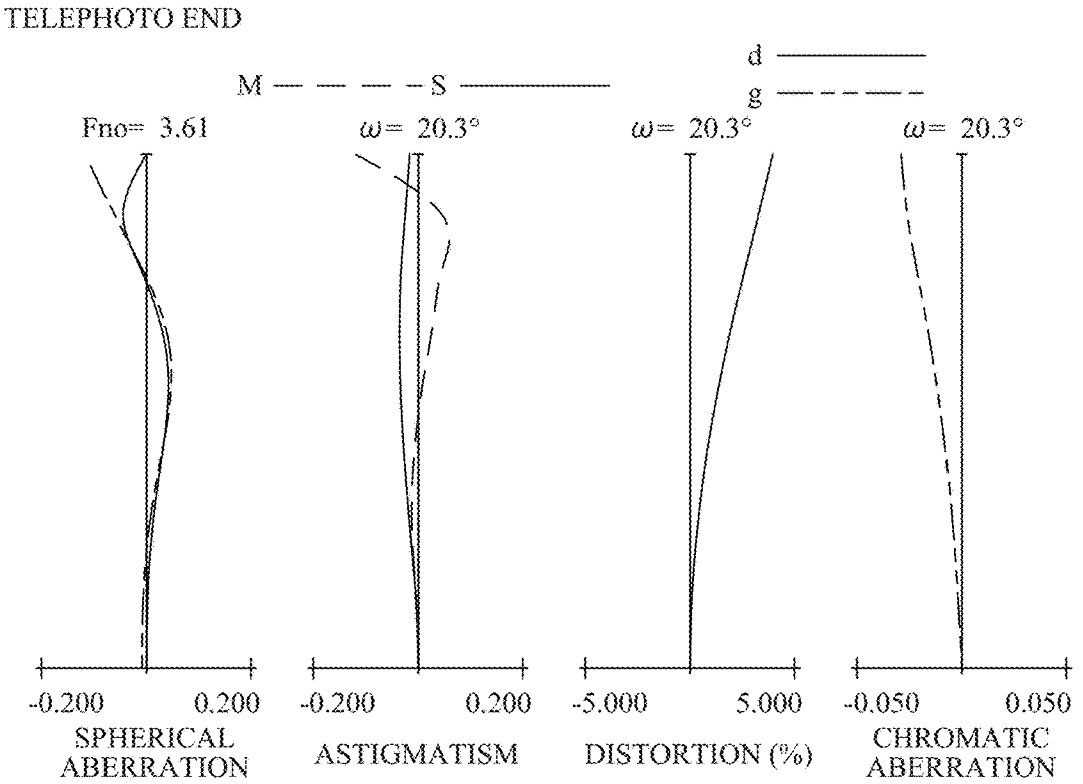
Figure 11:
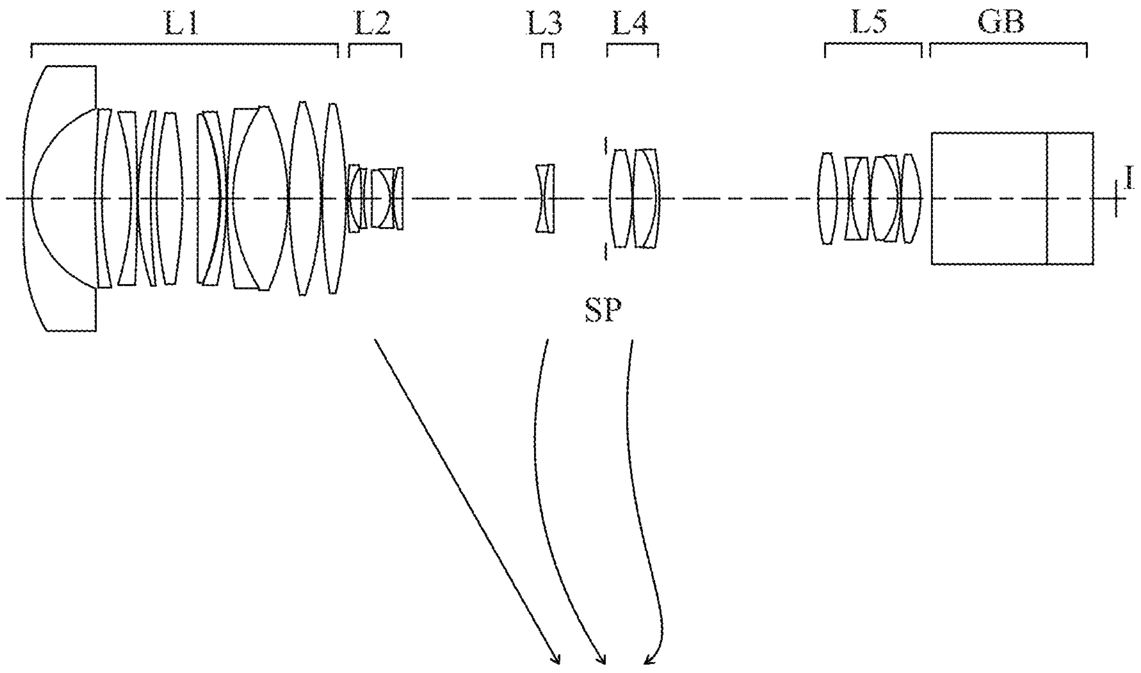
FIG. 11 is a sectional view of a zoom lens according to Example 6 at a wide-angle end.
Figure 12A:
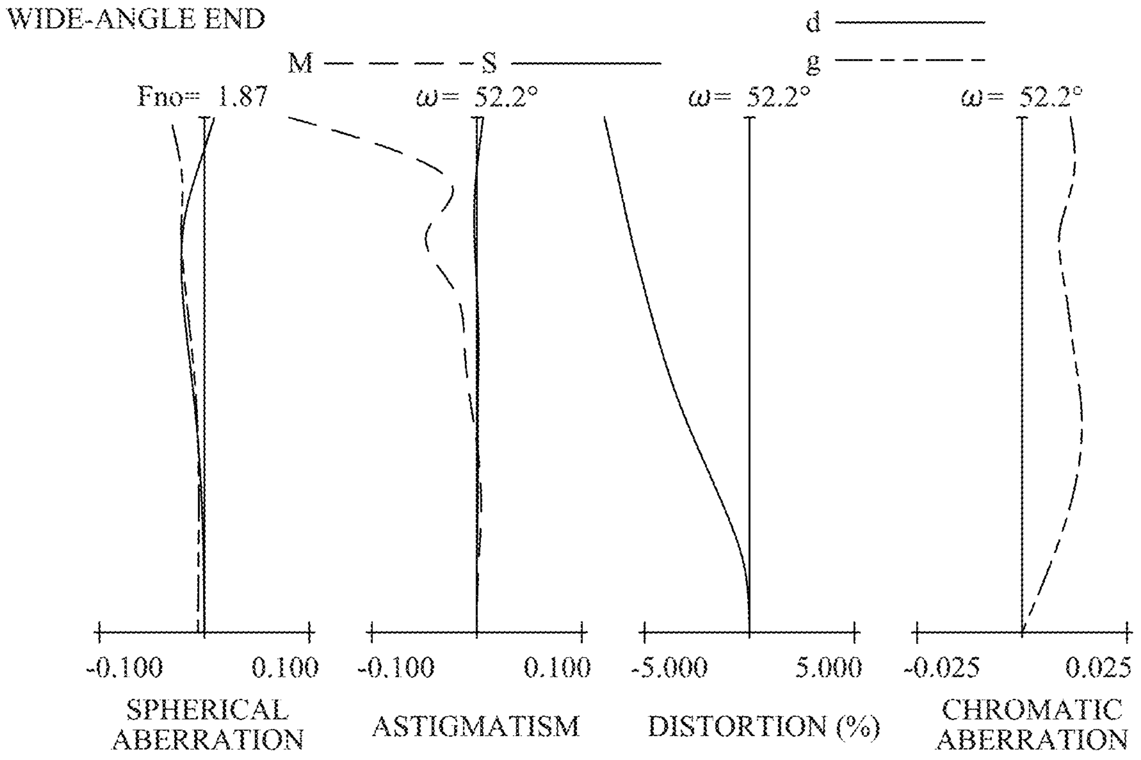
Figure 12B:
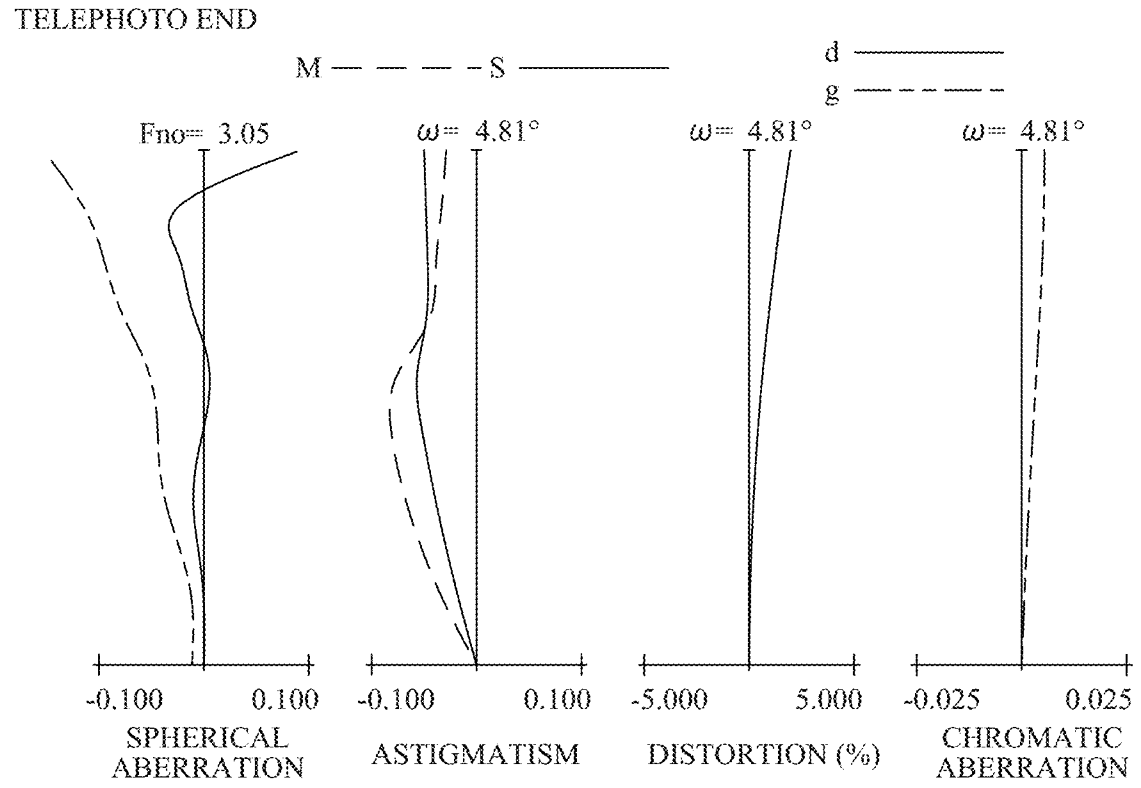
Figure 13:
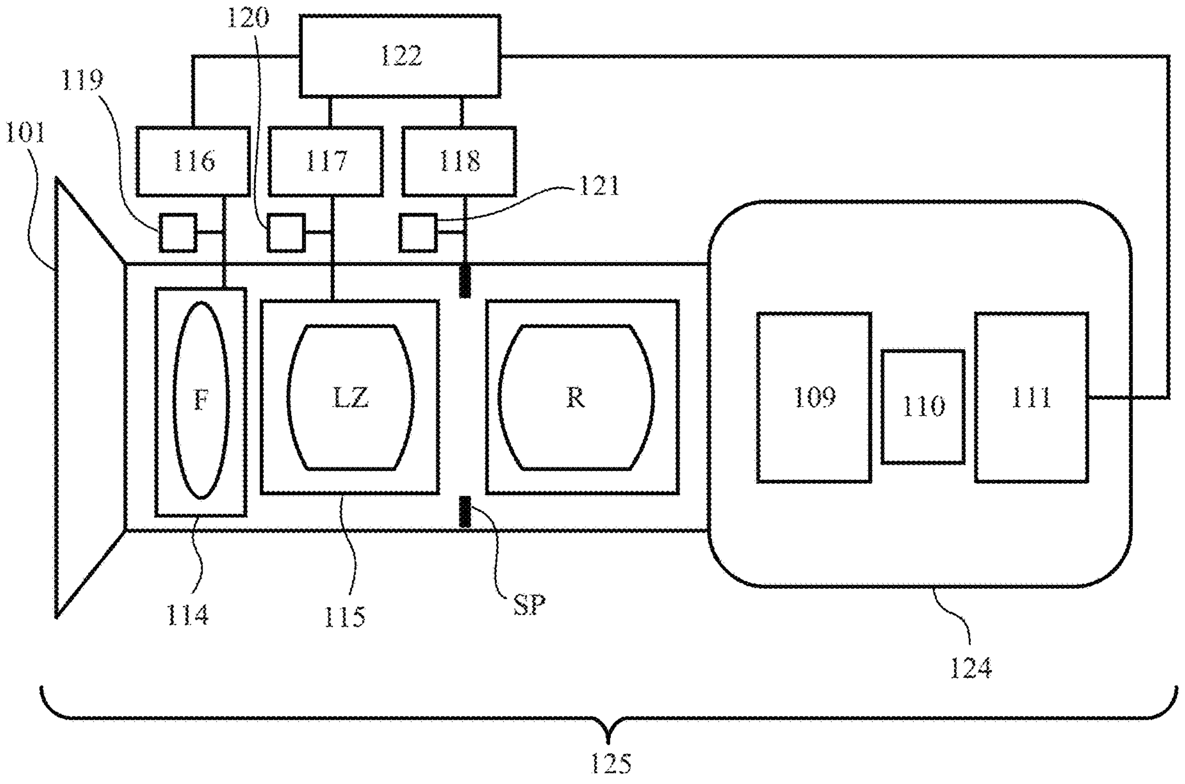

FIG. 13 illustrates the configuration of an image pickup apparatus having the zoom lens according to any one of Examples 1 to 6.

Figure 14:
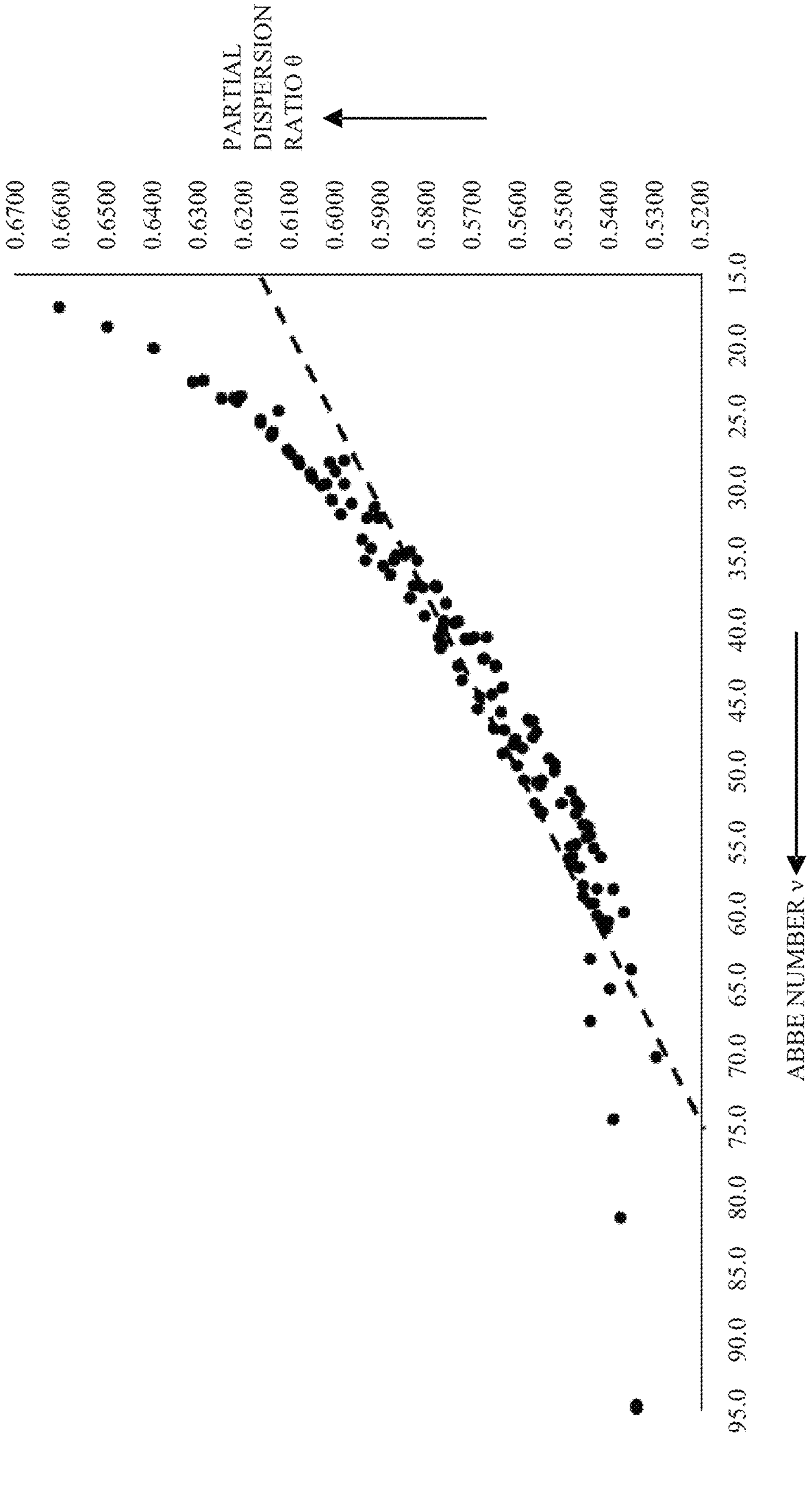

FIG. 14 illustrates a relationship between an Abbe number ν and a partial dispersion ratio θ of an optical material.

DESCRIPTION OF THE EMBODIMENTS

Referring now to the accompanying drawings, a description will be given of embodiments according to the disclosure. A description will now be given of an overview of zoom lenses according to Examples 1 to 6. FIGS. 1, 3, 5, 7, 9, and 11 illustrate the zoom lenses according to Examples 1, 2, 3, 4, 5, and 6 in an in-focus state on an object at infinity (referred to as "in-focus state at infinity" hereinafter) and a section of each zoom lens at a wide-angle end.

In a zoom lens, a lens unit is a group of one or more lenses that move together during magnification variation (zooming) between the wide-angle end and a telephoto end. That is, a distance between adjacent lens units changes during zooming. The lens unit may include an aperture stop (diaphragm). The wide-angle end and telephoto end are a maximum angle of view (shortest focal length) and a minimum angle of view (longest focal length), respectively, in a case where a lens unit that moves during zooming is located at both ends of a mechanically or controlled movably range on the optical axis. The sub-lens unit is a group of one or more lenses that move together during focusing. That is, a distance between adjacent sub-lens units changes during focusing.

In each figure, a left side is an object side and a right side is an image side. Li (i=1, 2, 3, . . . ) represents an i-th lens unit counted from the object side, a moving locus of each lens unit during zooming from the wide-angle end to the telephoto end is illustrated below the lens unit that moves for zooming.

L1 represents a first lens unit having positive refractive power that does not move for zooming. A first sub-lens unit 1*a* in the first lens unit L1 does not move for focusing, and a second sub-lens unit 1*b* in the first lens unit L1 moves toward the image side during focusing from an infinity object to a close (short-distance) object. A third sub-lens unit 1*c* in the first lens unit L1 does not move for focusing.

Reference numerals L2 to Lm (m=4 in Examples 1 and 3 to 6, m=5 in Example 2) represent three or more intermediate lens units that move for zooming, and reference numeral L2 denotes a first intermediate lens unit having negative refractive power. Reference numeral L3 denotes a second intermediate lens unit having positive or negative refractive power, and reference numeral L4 denotes a third intermediate lens unit having positive refractive power. Reference numeral L5 in Example 2 denotes a fourth intermediate lens unit having positive refractive power. The first intermediate lens unit L2 monotonically moves on the optical axis toward the image side for zooming from the wide-angle end to the telephoto end. The second intermediate lens unit L3 moves on the optical axis so as to draw a convex locus toward the object side (Examples 1, 3, 6) or monotonically (Examples 2, 4, 5) for zooming from the wide-angle end to the telephoto end. The third intermediate lens unit L4 and the fourth intermediate lens unit L5 according to Example 2 move non-monotonically on the optical axis toward the image side and the object side (Examples 1, 2, 3, 4, 6) or move monotonically on the optical axis toward the image side (Example 5) for zooming from the wide-angle end to the telephoto end.

SP represents an aperture stop. The aperture stop SP is provided in the third intermediate lens unit L4 (Examples 1 and 3 to 6) or the fourth intermediate lens unit L5 (Example 2), and moves together with these intermediate lens units during zooming.

Ln (n=5 in Examples 1 and 3 to 6, n=6 in Example 2) represents a rear lens unit having positive refractive power. In each example, the rear lens unit does not move for zooming, but the whole or part of the rear lens unit (sub-lens unit) may move.

I represents an image plane of the zoom lens. An imaging surface (light-receiving surface) of an image sensor and a film surface (photosensitive surface) of a silver film are disposed on the image plane I. GB represents a glass block having no refractive power, such as a prism, disposed between the rear lens unit Ln and the image plane I.

As described above, the zoom lens according to each example includes, in order from the object side to the image side, a first lens unit having positive refractive power that does not move for zooming, three or more movable intermediate lens units that move for zooming, and a rear lens unit having positive refractive power.

The first lens unit includes, in order from the object side to the image side, a first sub-lens unit having negative refractive power that does not move for focusing, a second sub-lens unit having positive refractive power that moves for focusing, and a third lens unit having positive refractive power. The third sub-lens unit may not move for focusing as in each example, or may move so as to change a distance from the second sub-lens unit. Further, the first lens unit may include sub-lens units other than the first to third sub-lens units that move or do not move during focusing.

The zoom lens according to each example satisfies the following inequalities:

$$2.430 \leq (f1 + bok1)/f1 \leq 4.500 \tag{1-1}$$

$$1.150 \leq ft/f1 \leq 3.200 \tag{2-1}$$

$$2.250 \leq f1/fw \leq 6.700 \tag{3}$$

where f1 is a focal length of the first lens unit, bok1 is a length on the optical axis from a lens surface closest to the image plane of the first lens unit in the in-focus state at infinity to the rear principal point of the first lens unit, fw is a focal length of the zoom lens at the wide-angle end, and ft is a focal length of the zoom lens at the telephoto end.

The zoom lens according to each example includes, in order from the object side to the image side, a first lens unit having positive refractive power that does not move for zooming, three or more intermediate lenses that move for zooming, an aperture stop, and a rear lens unit having positive refractive power. The aperture stop is disposed in one of the three or more intermediate lens units, and moves together with that intermediate lens unit during zooming. The aperture stop may be disposed adjacent to any intermediate lens unit. The first lens unit includes, in order from the object side to the image side, a first sub-lens unit having negative refractive power that does not move for focusing, a second sub-lens unit having positive refractive power that moves for focusing, and a third sub-lens unit having positive refractive power. The third sub-lens unit does not have to move for focusing as in each example, or may move so as to change a distance from the second sub-lens unit. The zoom lens according to each example satisfies the following inequalities:

$$2.000 \le (f1 + bok1)/f1 \le 4.500 \tag{1-2}$$

$$1.950 \le \mathrm{ft}/f1 \le 3.200 \tag{2-2}$$

Inequalities (1-1) and (1-2) define conditions for providing a zoom lens with a reduced size and weight, and a wide angle of view. The value of (f1+bok1)/f1 is a retro ratio of the first lens unit. Increasing the retro ratio is beneficial to a wide angle of view, but increases the diameter of the third sub-lens unit and the number of lenses of the first lens unit. In a case where the value (f1+bok1)/f1 becomes higher than the upper limit of inequality (1-1) or (1-2), the retro ratio of the first lens unit becomes excessively large, and the diameter of the third sub-lens unit increases, and it becomes difficult to acquire a zoom lens having a reduced size and weight. Further, the large number of lenses in the first lens unit is not beneficial to acquiring a compact and lightweight zoom lens. In a case where the value (f1+bok1)/f1 becomes lower than the lower limit of inequality (1-1) or (1-2), the retro ratio of the first lens unit becomes excessively small and it becomes difficult to acquire a zoom lens having a wide angle of view. In addition, the diameter of the lens closest to the object of the first lens unit increases, and it becomes difficult to acquire a zoom lens having a reduced size and weight.

Inequalities (2-1) and (2-2) define conditions for providing a zoom lens with a high magnification varying ratio, a reduced size and weight, and high optical performance. Increasing the value ft/f1 is beneficial to obtaining a zoom lens having a high magnification varying ratio, but since the aberrations generated in the first lens unit are enhanced at the telephoto end, it is difficult to keep aberrations within permissible ranges. In a case where the ft/f1 becomes higher than the upper limit of inequality (2-1) or (2-2), the focal length of the first lens unit becomes excessively short, and it becomes difficult to keep aberrations generated in the first lens unit within permissible ranges at the telephoto end. Further, the number of lenses constituting the first lens unit becomes too large to acquire a compact and lightweight zoom lens. In a case where the value ft/f1 becomes lower than the lower limit of inequality (2-1) or (2-2), the focal length of the first lens unit becomes excessively long, and it becomes difficult to obtain a zoom lens having a high magnification varying ratio. Moreover, a moving amount of the intermediate lens unit becomes too large to acquire a compact and lightweight zoom lens.

Inequality (3) defines a condition to provide a zoom lens with a wide angle of view, a reduced size and weight, and high optical performance. In a case where the value f1/fw becomes higher than the upper limit of inequality (3), the diameter of the first lens unit becomes large, and it becomes difficult to obtain a compact zoom lens. In a case where the value f1/fw becomes lower than the lower limit of inequality (3), it may become difficult to obtain a zoom lens having a wide angle of view, or it may become difficult to keep aberrations (coma, curvature of field, etc.) within permissible ranges at the wide-angle end.

Satisfying the above inequalities (1-1), (2-1), and (3) or (1-2) and (2-2) can provide a zoom lens with a reduced size and weight, high optical performance, a wide angle of view, and high magnification varying ratio.

The zoom lens according to each example may satisfy at least one of the following inequalities (4) to (15).

The first lens unit may include a negative lens G1 closest to the object, and the following inequality may be satisfied:

$$-2.10 \le \mathrm{ft}/fG1 \le -0.50 \tag{4}$$

where fG1 is a focal length of the negative lens G1.

Inequality (4) defines a condition to provide a zoom lens with a high magnification varying ratio, a reduced size and weight, and high optical performance. In a case where the value ft/fG1 becomes higher than the upper limit of inequality (4), the focal length of the negative lens G1 becomes excessively long, and the entrance pupil of the zoom lens is disposed excessively close to the object. As a result, the diameter of the first sub-lens unit increases, and it becomes difficult to provide the first lens unit with a reduced size. In addition, it becomes difficult to obtain a zoom lens with a high magnification varying ratio. In a case where the value ft/fG1 becomes lower than the lower limit of inequality (4), the focal length of the negative lens G1 becomes excessively short, and the diameter of the on-axis light beam at the telephoto end increases. As a result, the diameter of the third sub-lens unit increases, and it becomes difficult to provide the first lens unit with a reduced size.

The first sub-lens unit of the first lens unit may have a positive lens Gp, and the following inequality may be satisfied:

$$0.40 \le \mathrm{ft}/fGp \le 10.60 \tag{5}$$

where fGp is a focal length of the positive lens Gp.

Inequality (5) defines a condition to acquire a first lens unit in which chromatic aberration is satisfactorily corrected. In a case where the value ft/fGp becomes higher than the upper limit of inequality (5), the focal length of the positive lens G1p becomes excessively short, and it becomes difficult to correct spherical aberration at the telephoto end. As a result, it becomes difficult to acquire a first lens unit with well-corrected aberrations. In addition, it becomes difficult to obtain a zoom lens with a high magnification varying ratio. In a case where the value ft/fGp becomes higher than the upper limit of inequality (5), the focal length of the positive lens G1p becomes excessively long, and the chromatic aberration correction of the first sub-lens unit becomes unsatisfactory. As a result, it becomes difficult to obtain a first lens unit in which chromatic aberration is satisfactorily corrected.

The zoom lenses according to Examples 1 to 3 may satisfy the following inequalities (6) to (8):

$$-1.50 \le f1a/f1 \le -0.60 \tag{6}$$

$$2.00 \le f1b/f1 \le 6.50 \tag{7}$$

-continued $$1.30 \leq f1c/f1 \leq 4.50 \quad (8)$$

where f1a is a focal length of the first sub-lens unit, f1b is a focal length of the second sub-lens unit, and f1c is a focal length of the third sub-lens unit.

Inequalities (6) to (8) define conditions to provide a zoom lens with high optical performance. In a case where inequality (6) is not satisfied, the focal length f1 of the first lens unit or the focal length f1a of the first sub-lens unit becomes excessively small, and it becomes difficult to keep aberrations generated in the first lens unit or the first sub-lens unit within permissible ranges. In a case where inequality (7) is not satisfied, the focal length f1 of the first lens unit or the focal length f1b of the second sub-lens unit becomes excessively small, and it becomes difficult to keep aberrations generated in the first lens unit or the second sub-lens unit within permissible ranges. In a case where inequality (8) is not satisfied, the focal length f1 of the first lens unit or the focal length f1c of the third sub-lens unit becomes excessively small, and it becomes difficult to keep aberrations generated in the first lens unit or the third sub-lens unit within permissible ranges.

The following inequality may be satisfied:

$$1.10 \leq LD1/f1 \leq 6.50 \quad (9)$$

where LD1 is a thickness on the optical axis from a lens surface closest to the object of the first lens unit to a lens surface closest to the image side of the first lens unit.

Inequality (9) defines a condition to provide a zoom lens with a reduced size and weight, and high optical performance. In a case where the value LD1/f1 becomes higher than the upper limit of inequality (9), the first lens unit becomes excessively thick, and it becomes difficult to obtain a compact and lightweight zoom lens. Furthermore, the focal length of the first lens unit becomes excessively short, and it becomes difficult to keep aberration fluctuations associated with focusing within permissible ranges at the telephoto end. In a case where the value LD1/f1 becomes lower than the lower limit of inequality (9), the first lens unit becomes excessively thin, and it becomes difficult to provide the necessary number of lenses to suppress aberration fluctuations associated with focusing. Further, the focal length of the first lens unit becomes excessively long, a moving amount of the intermediate lens unit for zooming becomes excessively large, and it becomes difficult to obtain a compact and lightweight zoom lens.

In a case where the zoom lens according to each example is used for an image pickup apparatus having an imaging surface with a diagonal size of 2Y, the following inequality may be satisfied:

$$51.50° \leq \omega w \leq 65.00° \quad (10)$$

where ω is a half angle of view of the zoom lens at the wide-angle end.

The half angle of view ωw is defined as follows using the focal length fw of the zoom lens at the wide-angle end:

$$\omega w = \arctan(Y/fw)$$

Inequality (10) defines a condition to provide a zoom lens with a reduced size and weight, and a wide angle of view. Satisfying inequality (10) can widen the angle of view in various format sizes. In particular, in a case where ωw becomes higher than the upper limit of inequality (10), it becomes difficult to obtain a compact and lightweight zoom lens.

The following inequality may be satisfied:

$$1.30 \leq Fnow \leq 3.50 \quad (11)$$

where Fnow is an F-number of the zoom lens at the wide-angle end.

Inequality (11) defines a condition to acquire a bright zoom lens with a reduced size and weight. In a case where Fnow becomes lower than the lower limit of inequality (11), it becomes difficult to keep aberrations (spherical aberration, astigmatism, etc.) at the wide-angle end within permissible ranges. Further, in order to obtain high optical performance, each lens unit becomes excessively large, and it becomes difficult to obtain a compact and lightweight zoom lens. In a case where Fnow becomes higher than the upper limit of inequality (11), it becomes difficult to obtain a bright zoom lens.

The following inequality may be satisfied:

$$0.050 \leq fw/BFw \leq 0.430 \quad (12)$$

where BFw is a length on the optical axis from a lens surface on the image side of a lens closest to the image plane among lenses included in the zoom lens to the image plane (where an element with a finite focal length is referred to as a lens here).

Inequality (12) defines a condition for providing a zoom lens with a reduced size and weight, and a wide angle of view. In a case where the value fw/BFw becomes higher than the upper limit of inequality (12), the focal length at the wide-angle end becomes excessively long relative to the back focus of the zoom lens, and it becomes difficult to obtain a zoom lens with a wide angle of view. In a case where the value fw/BFw becomes lower than the lower limit of inequality (12), the back focus becomes excessively long relative to the focal length at the wide-angle end, and it becomes difficult to obtain a compact and lightweight zoom lens.

The following inequality may be satisfied:

$$2.0 \leq LDs/LT \leq 0.60 \quad (13)$$

where LDs is a length from a lens surface closest to the object of the first lens unit to the aperture stop in an in-focus state at infinity and the wide-angle end, and LT is an overall optical length (a length on the optical axis from a lens surface closest to the object of the first lens unit to a lens surface closest to the image side of the rear lens unit) of the zoom lens in the in-focus state at infinity and at wide-angle end.

Inequality (13) defines a condition for providing a zoom lens with a reduced size and weight, and a wide angle of view. In a case where the value LDs/LT becomes higher than the upper limit of inequality (13), the aperture stop is placed at a position that is too far from the lens surface on the object side of the first lens unit. As a result, in order to realize a zoom lens with a wide angle of view, the diameter of the first lens unit becomes excessively large, and it becomes difficult to obtain a small and lightweight zoom lens with a wide angle of view. In a case where the value LDs/LT becomes lower than the lower limit of inequality (13), the aperture stop is placed at a position that is too far from a lens surface of the rear lens unit. As a result, the diameter of the rear lens unit becomes excessively large, and it becomes difficult to obtain a compact and lightweight zoom lens.

The following inequality may be satisfied:

$$1.750 \leq nd1n \leq 2.000 \quad (14)$$

where nd1n is an average value of a refractive index for the d-line (wavelength 587.6 nm) of at least one negative lens included in the first lens unit.

Inequality (14) defines a condition for providing a zoom lens with a reduced size and weight, and high optical performance. In a case where the value nd1n becomes lower than the lower limit of inequality (14), an optical material (glass material) with a high refractive index tend to have a large specific gravity, and it becomes difficult to reduce the weight of the first lens unit. In a case where the value nd1n becomes lower than the lower limit of inequality (14), the refractive index becomes excessively small, and it becomes difficult to keep aberrations within permissible ranges.

The first sub-lens unit may have a positive lens L1ap and the following inequality may be satisfied:

$$17.0 \leq vd1ap \leq 35.0 \quad (15)$$

where νd1ap is an Abbe number of the positive lens L1ap based on the d-line.

Inequality (15) defines a condition for suppressing longitudinal chromatic aberration at the telephoto end and fluctuations in longitudinal chromatic aberration associated with focusing. FIG. 14 schematically illustrates a relationship between an Abbe number ν and a partial dispersion ratio θ in optical materials. As understood from FIG. 14, optical materials tend to exhibit anomalous dispersion in which the higher the dispersion is, the more the partial dispersion ratio deviates from a straight line indicated by a broken line. In a case where the value νd1ap becomes higher than the upper limit of inequality (15), it becomes difficult to keep fluctuations in the secondary spectrum of longitudinal chromatic aberration associated with focusing within permissible ranges. In a case where the value νd1ap becomes lower than the lower limit of inequality (15), the anomalous dispersion becomes excessively high, and it becomes difficult to keep the secondary spectrum of longitudinal chromatic aberration within a permissible range at the telephoto end. The positive lens L1ap may be a different lens from the positive lens Gp, or may be the same lens. In each numerical example described below, the positive lens Gp and the positive lens L1ap are the same lens.

As described above, the first lens unit includes the first sub-lens unit having negative refractive power that does not move for focusing, the second sub-lens unit having positive refractive power that moves for focusing, and the third sub-lens unit having positive refractive power. Therefore, fluctuations in aberration associated with focusing can be kept within a permissible range.

In the zoom lens according to each example, the aperture stop may be disposed within or adjacent to the intermediate lens unit and does not move during zooming. Thereby, moving space can be secured for the intermediate lens unit to obtain a zoom lens with a high magnification varying ratio.

Moreover, the first sub-lens unit may include two or more negative lenses. In a case where the first sub-lens unit has a single negative lens, the refractive power of the negative lens must be higher in order to correct chromatic aberration in the first lens unit, and corrections of various aberrations other than chromatic aberration such as spherical aberration become difficult. Furthermore, the two or more negative lenses may be successively arranged in order from the object side to the image side in the first sub-lens unit. Such an arrangement is beneficial to reducing the size and weight of the first sub-lens unit.

Inequalities (1-1) to (15) may be replaced with the following inequalities:

$$2.430 \leq (f1 + bok1)/f1 \leq 4.000 \quad (1\text{-}1a)$$

$$1.150 \leq ft/f1 \leq 3.000 \quad (2\text{-}1a)$$

$$2.300 \leq f1/fw \leq 6.500 \quad (3a)$$

$$2.200 \leq (f1 + bok1)/f1 \leq 3.200 \quad (1\text{-}2a)$$

$$2.000 \leq ft/f1 \leq 2.950 \quad (2\text{-}2a)$$

$$-1.90 \leq ft/fG1 \leq -0.70 \quad (4a)$$

$$0.60 \leq ft/fGp \leq 10.40 \quad (5a)$$

$$-1.30 \leq f1a/f1 \leq -0.70 \quad (6a)$$

$$2.20 \leq f1b/f1 \leq 6.45 \quad (7a)$$

$$1.50 \leq f1c/f1 \leq 4.00 \quad (8a)$$

$$1.30 \leq LD1/f1 \leq 6.30 \quad (9a)$$

$$51.70° \leq \omega w \leq 60.00° \quad (10a)$$

$$1.50 \leq Fnow \leq 3.30 \quad (11a)$$

$$0.055 \leq fw/BFw \leq 0.400 \quad (12a)$$

$$0.30 \leq LDs/LT \leq 0.55 \quad (13a)$$

$$1.770 \leq nd1n \leq 1.950 \quad (14a)$$

$$17.0 \leq vd1ap \leq 29.0 \quad (15a)$$

Inequalities (1-1) to (15) may be replaced with the following inequalities:

$$2.530 \leq (f1 + bok1)/f1 \leq 3.200 \quad (1\text{-}1b)$$

$$1.150 \leq ft/f1 \leq 2.950 \quad (2\text{-}1b)$$

$$2.350 \leq f1/fw \leq 6.500 \quad (3b)$$

$$2.400 \leq (f1 + bok1)/f1 \leq 3.200 \quad (1\text{-}2b)$$

$$2.040 \leq ft/f1 \leq 2.500 \quad (2\text{-}2b)$$

$$-1.86 \leq ft/fG1 \leq -0.90 \quad (4b)$$

$$0.80 \leq ft/fGp \leq 5.00 \quad (5b)$$

-continued $$-1.10 \le f1a/f1 \le -0.95 \quad (6b)$$

$$2.40 \le f1b/f1 \le 6.45 \quad (7b)$$

$$1.60 \le f1c/f1 \le 3.80 \quad (8b)$$

$$2.00 \le LD1/f1 \le 5.00 \quad (9b)$$

$$52.00^\circ \le \omega w \le 55.00^\circ \quad (10b)$$

$$1.70 \le Fnow \le 3.00 \quad (11b)$$

$$0.065 \le fw/BFw \le 0.380 \quad (12b)$$

$$0.40 \le LDs/LT \le 0.55 \quad (13b)$$

$$1.770 \le nd1n \le 1.850 \quad (14b)$$

$$17.0 \le vd1ap \le 26.0 \quad (15b)$$

Numerical examples 1 to 6 corresponding to Examples 1 to 6 will be illustrated below. In each numerical example, a surface number i represents an order of a surface counted from the object side. r represents a radius of curvature of an i-th surface from the object side (mm), d represents a lens thickness or air gap (mm) between i-th and (i+1)-th surfaces, and nd is a refractive index of an optical material for the d-line. νd is an Abbe number based on the d-line of the optical material between i-th and (i+1)-th surfaces. The Abbe number νd based on the d-line is expressed as follows:

$$vd = (Nd - 1)/(NF - NC)$$

where Nd, NF, and NC are refractive indices for the d-line (587.6 nm), F-line (486.1 nm), and C-line (656.3 nm) in the Fraunhofer line.

θgF is a partial dispersion ratio, and expressed as follows:

$$\theta gF = (Ng - NF)/(NF - NC)$$

where Ng is a refractive index for the g-line (wavelength 435.8 nm). An effective diameter is a diameter (mm) of a region of an i-th lens surface through which rays contributing to imaging pass.

Each numerical example illustrates a half angle of view (°) of the zoom lens, and a maximum image height corresponding to the half angle of view as an "image height." The half angle of view ω is defined as follows:

$$\omega = \arctan(Y/fw)$$

where fw is a focal length at the wide-angle end of the zoom lens used for an image pickup apparatus having an imaging surface with a diagonal size of 2Y The maximum image height corresponds to Y, which is half of the diagonal size 2Y (for example, 29.60 mm).

Each numerical example illustrates a focal length of each lens unit for the d-line as lens unit data. In each numerical example, BF represents back focus (mm). The back focus is a distance on the optical axis from the final surface (lens surface closest to the image plane) of the zoom lens to the paraxial image surface expressed in air equivalent length. An overall lens length (optical overall length) is a distance on the optical axis from the frontmost surface (lens surface closest to the object) to the final surface plus the back focus of the zoom lens.

An asterisk "*" attached to a surface number means that the surface has an aspherical shape. The aspherical shape is expressed as follows:

$$X = \frac{H^2/R}{1+\sqrt{1-(1+k)(H/R)^2}} + A3\cdot H^3 + A4\cdot H^4 + A5\cdot H^5 + A6\cdot H^6 + A7\cdot H^7 + A8\cdot H^8 + A9\cdot H^9 + A10\cdot H^{10} + A11\cdot H^{11} + A12\cdot H^{12} + A13\cdot H^{13} + A14\cdot H^{14} + A15\cdot H^{15} + A16\cdot H^{16}$$

where X is a displacement amount from the surface vertex in the optical axis direction, H is a height from the optical axis in the direction perpendicular to the optical axis, R is a paraxial radius of curvature, K is a conical constant, and A2 to A16 are aspherical coefficients of each order. "e±x" in a conic constant and aspherical coefficient means $\times 10^{\pm x}$. WIDE represents the wide-angle end, MIDDLE represents an intermediate (middle) zoom position, TELE represents a telephoto end.

As described above, in Examples 1 to 6, the rear lens unit does not move for zooming, but the entire rear lens unit or a part of it (sub-lens unit) may move. Even if the whole or part of the rear lens unit moves, as long as inequalities (1-1) or (1-2) to (3) are satisfied, a zoom lens can have a reduced size and weight, high optical performance, a wide angle of view, and a high magnification varying ratio. For example, in Example 1 (numerical example 1), fortieth to forty-ninth surfaces in the rear lens unit L5 may move for zooming. Since an approximately afocal light beam enters this portion from the object side, the optical characteristics other than the back focus generally remain unchanged even if this portion moves. Therefore, this portion can be used as a sub-lens unit that moves to compensate for focus change. The cause of the focus change that is compensated for by moving the entire rear lens unit or sub-lens units is at least one of manufacturing errors, temperature changes, and attitude change of the zoom lens.

FIGS. 2A, 4A, 6A, 8A, 10A, and 12A respectively illustrate the longitudinal aberrations (spherical aberration, astigmatism, distortion, and chromatic aberration) the zoom lenses according to numerical examples 1 to 6 at the wide-angle end. FIGS. 2B, 4B, 6B, 8B, 10B, and 12B respectively illustrate the longitudinal aberrations of the zoom lenses according to numerical examples 1 to 6 at the telephoto end.

In the spherical aberration diagram, Fno represents an F-number, a solid line indicates a spherical aberration amount for the d-line (wavelength 587.6 nm), and an alternate long and two short dashes line indicates a spherical aberration amount for the g-line (wavelength 435.8 nm). In the astigmatism diagram, a solid line S indicates an astigmatism amount on a sagittal image plane, and a broken line M indicates an astigmatism amount on a meridional image plane. The distortion diagram illustrates a distortion amount for the d-line. The chromatic aberration diagram illustrates a lateral chromatic aberration amount for the g-line. CO is a half angle of view (°).

Table 1 summarizes numerical values of inequalities (1-1) and (1-2) to (15) in each numerical example.

Numerical Example 1

UNIT: mm

SURFACE DATA

| Surface No. | r | d | nd | νd | θgf | Effective Diameter |
|---|---|---|---|---|---|---|
| 1* | −945.881 | 2.50 | 1.83481 | 42.7 | 0.5648 | 80.48 |
| 2 | 29.270 | 18.31 | | | | 54.30 |
| 3* | 280.173 | 2.00 | 1.83481 | 42.7 | 0.5648 | 53.75 |
| 4 | 155.870 | 5.45 | | | | 52.52 |
| 5 | −375.961 | 1.80 | 1.83481 | 42.7 | 0.5648 | 51.60 |
| 6 | 225.928 | 0.15 | | | | 50.99 |
| 7 | 84.818 | 3.18 | 1.92286 | 18.9 | 0.6495 | 50.77 |
| 8 | 163.735 | 1.67 | | | | 50.35 |
| 9 | 105.795 | 7.28 | 1.60300 | 65.4 | 0.5401 | 50.50 |
| 10* | −150.548 | 4.41 | | | | 50.53 |
| 11 | −4717.965 | 4.81 | 1.43387 | 95.1 | 0.5373 | 51.08 |
| 12 | −94.980 | 0.30 | | | | 51.23 |
| 13 | −88.919 | 1.70 | 1.80000 | 29.8 | 0.6017 | 51.23 |
| 14 | −232.086 | 0.18 | | | | 52.15 |
| 15 | 175.795 | 1.70 | 1.91650 | 31.6 | 0.5911 | 53.05 |
| 16 | 49.947 | 16.88 | 1.43875 | 94.7 | 0.5340 | 52.95 |
| 17 | −59.093 | 0.40 | | | | 54.17 |
| 18 | 96.943 | 9.06 | 1.43387 | 95.1 | 0.5373 | 57.99 |
| 19 | −139.950 | 0.40 | | | | 58.13 |
| 20 | 226.739 | 8.09 | 1.76385 | 48.5 | 0.5589 | 57.84 |
| 21 | −96.159 | (Variable) | | | | 57.58 |
| 22 | 116.531 | 0.70 | 2.00100 | 29.1 | 0.5997 | 16.83 |
| 23 | 15.705 | 2.44 | | | | 15.03 |
| 24 | −221.676 | 0.70 | 1.43875 | 94.7 | 0.5340 | 14.83 |
| 25 | 29.388 | 2.33 | | | | 14.89 |
| 26 | −297.693 | 5.26 | 1.85478 | 24.8 | 0.6122 | 15.36 |
| 27 | −11.681 | 0.70 | 1.88300 | 40.8 | 0.5667 | 15.85 |
| 28 | 79.733 | 0.21 | | | | 16.87 |
| 29 | 28.756 | 2.74 | 1.64769 | 33.8 | 0.5938 | 17.66 |
| 30 | 3447.924 | (Variable) | | | | 17.82 |
| 31 | −33.370 | 0.80 | 1.72916 | 54.7 | 0.5444 | 18.16 |
| 32 | 67.737 | 2.57 | 1.84666 | 23.8 | 0.6205 | 19.12 |
| 33 | −860.675 | (Variable) | | | | 19.68 |
| 34(SP) | ∞ | 1.20 | | | | 26.42 |
| 35* | 93.760 | 4.97 | 1.59522 | 67.7 | 0.5442 | 27.65 |
| 36 | −80.813 | 0.20 | | | | 28.34 |
| 37 | 405.249 | 5.77 | 1.53172 | 48.8 | 0.5631 | 28.65 |
| 38 | −31.138 | 1.00 | 1.88300 | 40.8 | 0.5667 | 28.83 |
| 39 | −50.564 | (Variable) | | | | 29.46 |
| 40 | 67.650 | 4.97 | 1.63980 | 34.5 | 0.5922 | 27.49 |
| 41 | −56.802 | 2.51 | | | | 27.38 |
| 42 | −125.211 | 0.90 | 1.88300 | 40.8 | 0.5667 | 25.84 |
| 43 | 27.932 | 4.22 | 1.48749 | 70.2 | 0.5300 | 25.25 |
| 44 | 363.120 | 0.20 | | | | 25.41 |
| 45 | 59.287 | 8.08 | 1.43875 | 94.7 | 0.5340 | 25.68 |
| 46 | −20.425 | 0.90 | 2.00100 | 29.1 | 0.5997 | 25.68 |
| 47 | −45.910 | 0.13 | | | | 27.14 |
| 48 | 72.344 | 5.70 | 1.48749 | 70.2 | 0.5300 | 28.02 |
| 49 | −35.435 | 3.31 | | | | 28.06 |
| 50 | ∞ | 33.00 | 1.60859 | 46.4 | 0.5664 | 40.00 |
| 51 | ∞ | 13.20 | 1.51680 | 64.2 | 0.5347 | 40.00 |
| 52 | ∞ | 8.30 | | | | 40.00 |
| Image Plane | ∞ | | | | | |

ASPHERIC DATA

1st Surface
K = 0.00000e+00 A 4 = 2.84749e−06 A 6 = −4.72980e−08 A 8 = −3.14612e−11
A10 = 9.09207e−14 A12 = 1.11026e−16 A14 = 1.64083e−20 A16 = 3.93184e−25
A 3 = 4.11397e−05 A 5 = 3.88082e−07 A 7= 2.10099e−09 A 9 = −1.07103e−12
A11 = −3.93486e−15 A13 = −1.84824e−18 A15 = −8.23382e−23
3rd Surface
K = 0.00000e+00 A 4 = −5.14521e−07 A 6 = −6.20253e−08 A 8 = −7.56683e−10
A10 = −3.25392e−13 A12 = 1.57466e−15 A14 = −6.47873e−19 A16 = −2.07821e−22
A 3 = −2.71914e−05 A 5 = 2.02826e−07 A 7 = 9.51601e−09 A 9 = 3.14741e−11
A11 = −3.27113e−14 A13 = −1.73567e−17 A15 = 2.23429e−20

-continued

| UNIT: mm |
|---|
| 10th Surface |
| K = 0.00000e+00 A 4 = 2.75132e−06 A 6 = 2.08109e−08 A 8 = 2.91496e−10 |
| A10 = 2.00838e−13 A12 = −7.68144e−16 A14 = 1.11564e−18 A16 = 2.19134e−22 |
| A 3 = −1.01147e−05 A 5 = −7.53981e−08 A 7 = −3.16716e−09 A 9 = −1.46328e−11 |
| A11 = 1.68471e−14 A13 = −5.56537e−18 A15 = −2.76125e−20 |
| 35th Surface |
| K = 7.99321e+00 A 4 = −3.72150e−06 A 6 = 1.86956e−09 A 8 = −4.16672e−12 |

VARIOUS DATA
MAGNIFICATION VARYING RATIO 15.31

| | WIDE | MIDDLE | TELE |
|---|---|---|---|
| Focal Length | 4.26 | 15.50 | 65.29 |
| Fno | 1.87 | 1.86 | 3.06 |
| Half Angle of View (°) | 52.21 | 19.54 | 4.81 |
| Image Height | 5.50 | 5.50 | 5.50 |
| Overall Lens Length | 313.33 | 313.33 | 313.33 |
| BF | 8.30 | 8.30 | 8.30 |
| d21 | 0.47 | 34.24 | 47.41 |
| d30 | 27.65 | 4.81 | 3.25 |
| d33 | 16.80 | 19.50 | 2.10 |
| d39 | 61.12 | 47.49 | 53.27 |
| Entrance Pupil Position | 27.35 | 50.24 | 98.54 |
| Exit Pupil Position | 93.65 | 151.47 | 119.26 |
| Front Principal-Point Position | 31.83 | 67.42 | 202.26 |
| Rear Principal-Point Position | 4.04 | −7.20 | −56.99 |

LENS UNIT DATA

| Lens Unit | Starting Surface | Focal Length | Lens Construction Length | Front Principal-Point Position | Rear Principal-Point Position |
|---|---|---|---|---|---|
| 1 | 1 | 26.94 | 90.27 | 40.28 | 37.44 |
| 2 | 22 | −15.68 | 15.08 | 0.04 | −11.20 |
| 3 | 31 | −52.40 | 3.37 | −0.14 | −1.99 |
| 4 | 34 | 48.60 | 13.14 | 5.10 | −3.93 |
| 5 | 40 | 51.91 | 77.12 | 14.09 | −40.11 |

Single lens data

| Lens | Starting Surface | Focal Length |
|---|---|---|
| 1(G1) | 1 | −33.78 |
| 2 | 3 | −421.61 |
| 3 | 5 | −167.88 |
| 4(Gp) | 7 | 184.76 |
| 5 | 9 | 103.78 |
| 6 | 11 | 222.78 |
| 7 | 13 | −179.72 |
| 8 | 15 | −76.05 |
| 9 | 16 | 64.59 |
| 10 | 18 | 133.22 |
| 11 | 20 | 88.93 |
| 12 | 22 | −18.05 |
| 13 | 24 | −58.94 |
| 14 | 26 | 13.97 |
| 15 | 27 | −11.43 |
| 16 | 29 | 44.45 |
| 17 | 31 | −30.43 |
| 18 | 32 | 73.53 |
| 19 | 35 | 73.45 |
| 20 | 37 | 54.37 |
| 21 | 38 | −93.52 |
| 22 | 40 | 48.69 |
| 23 | 42 | −25.64 |
| 24 | 43 | 61.61 |
| 25 | 45 | 35.64 |
| 26 | 46 | −37.12 |
| 27 | 48 | 49.49 |

Numerical Example 2

| UNIT: mm | | | | | | |
|---|---|---|---|---|---|---|
| SURFACE DATA | | | | | | |
| Surface No. | r | d | nd | νd | θgf | Effective Diameter |
| 1* | 12211.103 | 2.50 | 1.83481 | 42.7 | 0.5648 | 80.82 |
| 2 | 30.014 | 20.06 | | | | 55.36 |
| 3* | −809.246 | 2.00 | 1.83481 | 42.7 | 0.5648 | 54.89 |
| 4 | 289.295 | 6.77 | | | | 54.04 |
| 5 | −103.864 | 1.80 | 1.83481 | 42.7 | 0.5648 | 53.57 |
| 6 | −366.769 | 0.15 | | | | 54.08 |
| 7 | 93.191 | 3.39 | 1.95906 | 17.5 | 0.6598 | 54.55 |
| 8 | 191.645 | 1.67 | | | | 54.24 |
| 9 | 119.971 | 7.96 | 1.60300 | 65.4 | 0.5401 | 53.64 |
| 10* | −143.650 | 4.41 | | | | 52.75 |
| 11 | −3915.938 | 4.55 | 1.43387 | 95.1 | 0.5373 | 51.26 |
| 12 | −100.849 | 0.30 | | | | 51.06 |
| 13 | −94.025 | 1.70 | 1.80000 | 29.8 | 0.6017 | 51.03 |
| 14 | −563.927 | 0.18 | | | | 51.07 |
| 15 | 138.558 | 1.70 | 1.91650 | 31.6 | 0.5911 | 52.27 |
| 16 | 50.209 | 15.72 | 1.43875 | 94.7 | 0.5340 | 52.58 |
| 17 | −68.242 | 0.40 | | | | 54.01 |
| 18 | 105.486 | 9.06 | 1.43387 | 95.1 | 0.5373 | 57.90 |
| 19 | −125.338 | 0.40 | | | | 58.03 |
| 20 | 111.550 | 7.77 | 1.76385 | 48.5 | 0.5589 | 57.41 |
| 21 | −185.845 | (Variable) | | | | 56.90 |
| 22 | 120.162 | 0.70 | 2.00100 | 29.1 | 0.5997 | 23.10 |
| 23 | 19.419 | 3.86 | | | | 20.55 |
| 24 | −103.913 | 0.70 | 1.43875 | 94.7 | 0.5340 | 20.36 |
| 25 | 38.940 | 2.33 | | | | 19.75 |
| 26 | 219.020 | 6.04 | 1.85478 | 24.8 | 0.6122 | 19.59 |
| 27 | −14.964 | 0.70 | 1.88300 | 40.8 | 0.5667 | 19.34 |
| 28 | 123.675 | (Variable) | | | | 18.96 |
| 29 | 28.588 | 2.11 | 1.64769 | 33.8 | 0.5938 | 18.95 |
| 30 | 50.473 | (Variable) | | | | 18.79 |
| 31 | −32.068 | 0.80 | 1.72916 | 54.7 | 0.5444 | 19.10 |
| 32 | 36.940 | 2.57 | 1.84666 | 23.8 | 0.6205 | 20.43 |
| 33 | 242.027 | (Variable) | | | | 20.83 |
| 34(SP) | ∞ | 1.20 | | | | 27.23 |
| 35* | 62.453 | 7.05 | 1.59522 | 67.7 | 0.5442 | 28.92 |
| 36 | −41.280 | 0.20 | | | | 29.68 |
| 37 | 23.453 | 7.21 | 1.53172 | 48.8 | 0.5631 | 29.40 |
| 38 | 2133.833 | 1.00 | 1.88300 | 40.8 | 0.5667 | 28.27 |
| 39 | 28.913 | (Variable) | | | | 26.44 |
| 40 | 73.142 | 4.66 | 1.63980 | 34.5 | 0.5922 | 28.49 |
| 41 | −61.591 | 4.70 | | | | 28.30 |
| 42 | 2025.038 | 0.90 | 1.88300 | 40.8 | 0.5667 | 25.80 |
| 43 | 30.653 | 4.05 | 1.48749 | 70.2 | 0.5300 | 25.21 |
| 44 | 891.785 | 0.20 | | | | 25.25 |
| 45 | 45.385 | 8.05 | 1.43875 | 94.7 | 0.5340 | 25.36 |
| 46 | −22.226 | 0.90 | 2.00100 | 29.1 | 0.5997 | 25.03 |
| 47 | −80.463 | 0.13 | | | | 26.05 |
| 48 | 71.951 | 5.72 | 1.48749 | 70.2 | 0.5300 | 26.60 |
| 49 | −35.437 | 3.31 | | | | 26.65 |
| 50 | ∞ | 33.00 | 1.60859 | 46.4 | 0.5664 | 40.00 |
| 51 | ∞ | 13.20 | 1.51680 | 64.2 | 0.5347 | 40.00 |
| 52 | ∞ | 6.60 | | | | 40.00 |
| Image Plane | ∞ | | | | | |

ASPHERIC DATA

1st Surface
K = 0.00000e+00 A 4 = 5.02691e−07 A 6 = −2.29078e−07 A 8 = −9.93791e−10
A10 = −3.56214e−13 A12 = −2.64958e−17 A14 = −2.68484e−19 A16 = −1.77502e−23
A 3 = 2.93295e−05 A 5 = 1.35804e−06 A 7 = 1.96430e−08 A 9 = 2.88206e−11
A11 = −2.10419e−15 A13 = 8.63402e−18 A15 = 3.51972e−21
3rd Surface
K = 0.00000e+00 A 4 = 2.36250e−06 A 6 = 6.71936e−08 A 8 = 1.49253e−09
A10 = 1.43219e−11 A12 = 8.70708e−15 A14 = −1.67551e−17 A16 = −2.24090e−21
A 3 = −2.44336e−05 A 5 = −5.96676e−07 A 7 = −8.04704e−09 A 9 = −1.92209e−10
A11 = −5.85477e−13 A13 = 2.91912e−16 A15 = 3.17497e−19

-continued

| UNIT: mm |
|---|
| 10th Surface<br>K = 0.00000e+00 A 4 = 3.65510e−06 A 6 = 1.13965e−07 A 8 = 1.02220e−09<br>A10 = 2.65923e−13 A12 = −9.29090e−16 A14 = 5.32742e−18 A16 = 8.66633e−22<br>A 3 = −1.07786e−05 A 5 = −6.47589e−07 A 7 = −1.34289e−08 A 9 = −4.23846e−11<br>A11 = 4.98125e−14 A13 = −9.28559e−17 A15 = −1.11408e−19<br>35th Surface<br>K = 7.10084e+00 A 4 = −1.09453e−05 A 6 = 1.58919e−09 A 8 = −1.94765e−11 |

VARIOUS DATA
MAGNIFICATION VARYING RATIO 15.31

| | WIDE | MIDDLE | TELE |
|---|---|---|---|
| Focal Length | 4.26 | 15.50 | 65.29 |
| Fno | 1.87 | 1.87 | 3.06 |
| Half Angle of View (°) | 52.21 | 19.54 | 4.81 |
| Image Height | 5.50 | 5.50 | 5.50 |
| Overall Lens Length | 313.33 | 313.33 | 313.33 |
| BF | 6.60 | 6.60 | 6.60 |
| d21 | 0.47 | 34.56 | 50.47 |
| d28 | −0.19 | 0.23 | 0.43 |
| d30 | 39.54 | 7.88 | 4.97 |
| d33 | 13.78 | 16.68 | 2.09 |
| d39 | 45.34 | 39.59 | 40.98 |
| Entrance Pupil Position | 28.51 | 48.56 | 98.71 |
| Exit Pupil Position | 125.35 | 182.15 | 164.14 |
| Front Principal-Point Position | 32.93 | 65.43 | 191.07 |
| Rear Principal-Point Position | 2.34 | −8.90 | −58.69 |

LENS UNIT DATA

| Lens Unit | Starting Surface | Focal Length | Lens Construction Length | Front Principal-Point Position | Rear Principal-Point Position |
|---|---|---|---|---|---|
| 1 | 1 | 28.55 | 92.49 | 42.24 | 42.05 |
| 2 | 22 | −14.29 | 14.33 | 2.31 | −7.64 |
| 3 | 29 | 98.08 | 2.11 | −1.61 | −2.85 |
| 4 | 31 | −43.19 | 3.37 | 0.22 | −1.63 |
| 5 | 34 | 43.17 | 16.66 | −3.30 | −12.19 |
| 6 | 40 | 47.47 | 78.82 | 11.25 | −45.62 |

Single lens data

| Lens | Starting Surface | Focal Length |
|---|---|---|
| 1(G1) | 1 | −36.04 |
| 2 | 3 | −255.07 |
| 3 | 5 | −174.11 |
| 4(Gp) | 7 | 186.01 |
| 5 | 9 | 109.66 |
| 6 | 11 | 238.50 |
| 7 | 13 | −141.28 |
| 8 | 15 | −86.71 |
| 9 | 16 | 68.71 |
| 10 | 18 | 133.61 |
| 11 | 20 | 92.30 |
| 12 | 22 | −23.22 |
| 13 | 24 | −64.46 |
| 14 | 26 | 16.58 |
| 15 | 27 | −15.08 |
| 16 | 29 | 98.08 |
| 17 | 31 | −23.43 |
| 18 | 32 | 51.19 |
| 19 | 35 | 42.84 |
| 20 | 37 | 44.54 |
| 21 | 38 | −33.20 |
| 22 | 40 | 52.98 |
| 23 | 42 | −35.26 |
| 24 | 43 | 65.02 |
| 25 | 45 | 35.29 |
| 26 | 46 | −30.92 |
| 27 | 48 | 49.57 |

Numerical Example 3

| UNIT: mm | | | | | | |
|---|---|---|---|---|---|---|
| SURFACE DATA | | | | | | |
| Surface No. | r | d | nd | νd | θgf | Effective Diameter |
| 1* | −253.468 | 2.40 | 1.76385 | 48.5 | 0.5589 | 74.29 |
| 2 | 27.608 | 14.31 | | | | 50.21 |
| 3 | 105.984 | 1.60 | 2.00100 | 29.1 | 0.5997 | 49.47 |
| 4 | 40.143 | 18.02 | | | | 46.06 |
| 5 | −31.685 | 1.50 | 1.76385 | 48.5 | 0.5589 | 46.21 |
| 6 | −50.980 | 0.20 | | | | 50.65 |
| 7 | 3003.474 | 7.72 | 1.89286 | 20.4 | 0.6393 | 56.17 |
| 8 | −72.723 | 1.50 | | | | 56.85 |
| 9 | 82.988 | 9.11 | 1.61800 | 63.3 | 0.5441 | 56.82 |
| 10* | −147.576 | 5.06 | | | | 56.57 |
| 11 | 133.599 | 13.21 | 1.52841 | 76.5 | 0.5396 | 56.36 |
| 12 | −55.404 | 1.80 | 1.95375 | 32.3 | 0.5905 | 55.95 |
| 13 | −71.004 | 0.20 | | | | 56.43 |
| 14 | 238.752 | 1.65 | 2.05090 | 26.9 | 0.6054 | 51.72 |
| 15 | 41.558 | 14.30 | 1.49700 | 81.5 | 0.5375 | 48.40 |
| 16 | −84.763 | 0.20 | | | | 48.22 |
| 17 | 2180.027 | 4.69 | 1.76385 | 48.5 | 0.5589 | 46.68 |
| 18 | −107.580 | (Variable) | | | | 46.44 |
| 19* | 99.650 | 1.20 | 1.89190 | 37.1 | 0.5780 | 26.29 |
| 20 | 24.509 | 5.04 | | | | 23.47 |
| 21 | −66.164 | 0.80 | 1.59522 | 67.7 | 0.5442 | 22.71 |
| 22 | 51.110 | 3.42 | 1.85478 | 24.8 | 0.6122 | 21.87 |
| 23 | −79.694 | 1.60 | | | | 21.70 |
| 24 | −28.497 | 0.80 | 1.76385 | 48.5 | 0.5589 | 21.67 |
| 25 | −50.982 | (Variable) | | | | 22.14 |
| 26 | −40.299 | 0.80 | 1.59522 | 67.7 | 0.5442 | 22.42 |
| 27 | 43.233 | 2.06 | 1.85478 | 24.8 | 0.6122 | 23.66 |
| 28 | 77.509 | (Variable) | | | | 23.89 |
| 29(SP) | ∞ | 1.00 | | | | 27.50 |
| 30* | 31.967 | 7.75 | 1.60342 | 38.0 | 0.5835 | 30.37 |
| 31 | −52.247 | 0.20 | | | | 30.40 |
| 32 | 1068.339 | 6.21 | 1.76182 | 26.5 | 0.6136 | 29.46 |
| 33 | −27.253 | 0.90 | 2.05090 | 26.9 | 0.6054 | 29.04 |
| 34 | 374.491 | (Variable) | | | | 29.04 |
| 35 | 95.983 | 3.24 | 1.56732 | 42.8 | 0.5731 | 29.61 |
| 36 | −180.749 | 0.20 | | | | 29.52 |
| 37 | 110.142 | 1.00 | 2.05090 | 26.9 | 0.6054 | 29.18 |
| 38 | 31.469 | 5.68 | 1.53775 | 74.7 | 0.5392 | 28.39 |
| 39 | −128.437 | 40.06 | | | | 28.43 |
| 40 | 59.850 | 10.55 | 1.48749 | 70.2 | 0.5300 | 37.65 |
| 41 | −71.930 | 0.40 | | | | 37.51 |
| 42 | 58.181 | 8.55 | 1.85896 | 22.7 | 0.6284 | 35.71 |
| 43 | −50.800 | 1.10 | 1.88300 | 40.8 | 0.5667 | 34.43 |
| 44 | 33.103 | 1.60 | | | | 30.86 |
| 45 | 45.400 | 10.93 | 1.43875 | 94.9 | 0.5340 | 30.88 |
| 46 | −24.480 | 1.50 | 2.05090 | 26.9 | 0.6054 | 30.35 |
| 47 | 1603.558 | 0.20 | | | | 32.66 |
| 48 | 77.994 | 8.15 | 1.53775 | 74.7 | 0.5392 | 34.19 |
| 49 | −36.510 | 36.98 | | | | 34.73 |
| Image Plane | ∞ | | | | | |

ASPHERIC DATA

1st Surface
K = 0.00000e+00 A 4 = 9.63421e−06 A 6 = −1.25665e−08 A 8 = 1.63812e−11
A10 = −1.59429e−14 A12 = 1.01106e−17 A14 = −3.64168e−21 A16 = 5.61323e−25
10th Surface
K = 0.00000e+00 A 4 = 2.59557e−06 A 6 = −4.92566e−10 A 8 = 7.10252e−14
19th Surface
K = 0.00000e+00 A 4 = 5.04595e−06 A 6 = −1.12643e−08 A 8 = 1.49775e−10
A10 = −9.03675e−13 A12 = 2.07771e−15
30th Surface
K = 0.00000e+00 A 4 = −6.97394e−06 A 6 = −2.67278e−09 A 8 = −2.91492e−12

-continued

UNIT: mm

VARIOUS DATA
MAGNIFICATION VARYING RATIO 4.87

| | WIDE | MIDDLE | TELE |
|---|---|---|---|
| Focal Length | 11.30 | 21.67 | 55.00 |
| Fno | 2.73 | 2.72 | 3.65 |
| Half Angle of View (°) | 52.65 | 34.34 | 15.06 |
| Image Height | 4.80 | 14.80 | 14.80 |
| Overall Lens Length | 310.95 | 310.95 | 310.95 |
| BF | 36.98 | 36.98 | 36.98 |
| d18 | 1.00 | 22.30 | 41.97 |
| d25 | 21.21 | 3.96 | 6.77 |
| d28 | 12.85 | 12.68 | 0.99 |
| d34 | 16.51 | 12.63 | 1.84 |
| Entrance Pupil Position | 24.75 | 30.08 | 43.75 |
| Exit Pupil Position | −1294.01 | −610.82 | −239.02 |
| Front Principal-Point Position | 35.95 | 51.02 | 87.79 |
| Rear Principal-Point Position | 25.68 | 15.31 | −18.02 |

LENS UNIT DATA

| Lens Unit | Starting Surface | Focal Length | Lens Construction Length | Front Principal-Point Position | Rear Principal-Point Position |
|---|---|---|---|---|---|
| 1 | 1 | 26.85 | 97.46 | 39.05 | 50.85 |
| 2 | 19 | −30.40 | 12.86 | 1.88 | −7.96 |
| 3 | 26 | −50.15 | 2.86 | 0.74 | −0.86 |
| 4 | 29 | 51.67 | 16.06 | −1.78 | −10.98 |
| 5 | 35 | 68.54 | 93.16 | 39.19 | −50.26 |

Single lens data

| Lens | Starting Surface | Focal Length |
|---|---|---|
| 1(G1) | 1 | −32.47 |
| 2 | 3 | −65.35 |
| 3 | 5 | −113.42 |
| 4(Gp) | 7 | 79.62 |
| 5 | 9 | 87.27 |
| 6 | 11 | 75.95 |
| 7 | 12 | −280.17 |
| 8 | 14 | −48.09 |
| 9 | 15 | 58.30 |
| 10 | 17 | 134.34 |
| 11 | 19 | −36.72 |
| 12 | 21 | −48.32 |
| 13 | 22 | 36.87 |
| 14 | 24 | −85.91 |
| 15 | 26 | −34.92 |
| 16 | 27 | 111.29 |
| 17 | 30 | 34.05 |
| 18 | 32 | 34.97 |
| 19 | 33 | −24.15 |
| 20 | 35 | 110.98 |
| 21 | 37 | −42.20 |
| 22 | 38 | 47.59 |
| 23 | 40 | 68.82 |
| 24 | 42 | 32.76 |
| 25 | 43 | −22.56 |
| 26 | 45 | 38.07 |
| 27 | 46 | −22.93 |
| 28 | 48 | 47.43 |

Numerical Example 4

UNIT: mm

SURFACE DATA

| Surface No. | r | d | nd | νd | θgf | Effective Diameter |
|---|---|---|---|---|---|---|
| 1* | −444.176 | 2.40 | 1.80100 | 35.0 | 0.5864 | 87.01 |
| 2 | 43.777 | 11.69 | | | | 69.79 |
| 3* | 36.086 | 1.80 | 1.90366 | 31.3 | 0.5946 | 61.22 |
| 4 | 30.593 | 13.59 | | | | 50.59 |
| 5 | 404.168 | 1.65 | 1.90366 | 31.3 | 0.5946 | 49.92 |
| 6 | 55.901 | 9.87 | | | | 47.41 |
| 7 | −70.923 | 1.66 | 1.48749 | 70.2 | 0.5300 | 47.44 |
| 8 | 72.406 | 9.73 | 1.80518 | 25.5 | 0.6156 | 54.45 |
| 9 | −327.068 | 2.67 | | | | 55.58 |
| 10 | 164.678 | 7.64 | 1.73800 | 32.3 | 0.5900 | 58.85 |
| 11 | −225.402 | 1.24 | | | | 59.21 |
| 12 | 182.121 | 6.41 | 1.43875 | 94.9 | 0.5340 | 59.29 |
| 13* | −275.332 | 1.19 | | | | 59.02 |
| 14 | 164.419 | 1.74 | 1.84666 | 23.8 | 0.6205 | 58.28 |
| 15 | 55.949 | 16.44 | 1.43875 | 94.9 | 0.5340 | 56.58 |
| 16 | −72.396 | 0.60 | | | | 56.59 |
| 17 | 323.358 | 9.97 | 1.52841 | 76.5 | 0.5396 | 55.42 |
| 18 | −69.307 | (Variable) | | | | 54.99 |
| 19 | 88.263 | 1.00 | 1.59282 | 68.6 | 0.5458 | 29.67 |
| 20 | 31.954 | 4.22 | | | | 28.42 |
| 21 | −1142.816 | 1.00 | 1.72916 | 54.7 | 0.5444 | 28.35 |
| 22 | 43.019 | 2.67 | | | | 28.23 |
| 23 | 39.842 | 5.61 | 1.72825 | 28.5 | 0.6077 | 29.75 |
| 24 | −90.784 | 1.00 | 1.71300 | 53.9 | 0.5459 | 29.62 |
| 25 | 579.762 | 2.20 | | | | 29.42 |
| 26 | −57.618 | 1.00 | 1.91082 | 35.2 | 0.5824 | 29.41 |
| 27 | 129.891 | (Variable) | | | | 30.14 |
| 28 | 146.603 | 2.71 | 1.49700 | 81.5 | 0.5375 | 31.09 |
| 29 | −143.508 | (Variable) | | | | 31.42 |
| 30(SP) | ∞ | 5.31 | | | | 31.82 |
| 31* | 56.511 | 6.08 | 1.72047 | 34.7 | 0.5834 | 34.78 |
| 32 | −62.820 | 0.20 | | | | 34.73 |
| 33 | −149.624 | 4.78 | 1.51633 | 64.1 | 0.5353 | 33.85 |
| 34 | −32.589 | 1.20 | 1.80400 | 46.5 | 0.5577 | 33.58 |
| 35 | 276.298 | (Variable) | | | | 33.50 |
| 36 | −124.952 | 2.11 | 1.59282 | 68.6 | 0.5458 | 33.87 |
| 37 | −65.314 | 0.20 | | | | 34.29 |
| 38 | 43.650 | 1.27 | 1.59270 | 35.3 | 0.5933 | 36.66 |
| 39 | 32.430 | 8.28 | 1.49700 | 81.5 | 0.5375 | 36.31 |
| 40 | −96.477 | 11.34 | | | | 36.26 |
| 41 | 68.905 | 6.07 | 1.53775 | 74.7 | 0.5392 | 32.17 |
| 42 | −42.512 | 1.17 | 1.95375 | 32.3 | 0.5898 | 31.80 |
| 43 | 34.421 | 1.23 | | | | 31.11 |
| 44 | 38.129 | 10.03 | 1.49700 | 81.5 | 0.5375 | 32.20 |
| 45 | −29.669 | 1.00 | 1.71700 | 47.9 | 0.5605 | 32.58 |
| 46 | −95.177 | 0.20 | | | | 34.15 |
| 47 | 70.065 | 1.10 | 1.91082 | 35.2 | 0.5824 | 35.62 |
| 48 | 28.894 | 6.88 | 1.68893 | 31.1 | 0.6004 | 35.30 |
| 49 | 850.653 | 0.69 | | | | 35.43 |
| 50 | ∞ | 2.62 | 1.51680 | 64.2 | 0.5342 | 35.56 |
| 51 | ∞ | 40.64 | | | | 35.99 |
| Image Plane | ∞ | | | | | |

ASPHERIC DATA

1st Surface
K = 0.00000e+00 A 4 = 1.21350e−05 A 6 = −1.99552e−08 A 8 = 3.37079e−11
A10 = −4.48716e−14 A12 = 4.39832e−17 A14 = −2.99515e−20 A16 = 1.33049e−23
A18 = −3.44636e−27 A20 = 3.94087e−31
3rd Surface
K = 0.00000e+00 A 4 = −1.09431e−05 A 6 = 4.70382e−09 A 8 = −1.54386e−12
A10 = −1.93669e−14 A12 = 6.27322e−17 A14 = −1.14572e−19 A16 = 1.27270e−22
A18 = −7.87089e−26 A20 = 2.02484e−29
13th Surface
K = 0.00000e+00 A 4 = 9.20115e−07 A 6 = −1.11586e−09 A 8 = 8.17021e−12
A10 = −3.66809e−14 A12 = 1.04629e−16 A14 = −1.89350e−19 A16 = 2.08229e−22
A18 = −1.26362e−25 A20 = 3.23875e−29

-continued

| UNIT: mm |
|---|
| 31st Surface<br>K = 0.00000e+00 A 4 = −1.28333e−06 A 6 = −1.91066e−09 A 8 = 2.52806e−11<br>A10 = −1.34916e−13 A12 = −1.41160e−16 A14 = 5.94365e−18 A16 = −3.14443e−20<br>A18 = 7.12585e−23 A20 = −6.11458e−26 |

VARIOUS DATA
MAGNIFICATION VARYING RATIO 2.73

| | WIDE | MIDDLE | TELE |
|---|---|---|---|
| Focal Length | 16.50 | 22.43 | 45.00 |
| Fno | 2.75 | 2.74 | 2.77 |
| Half Angle of View (°) | 52.67 | 43.97 | 25.68 |
| Image Height | 21.64 | 21.64 | 21.64 |
| Overall Lens Length | 287.74 | 287.74 | 287.74 |
| BF | 40.64 | 40.64 | 40.64 |
| d18 | 0.20 | 19.79 | 49.19 |
| d27 | 2.00 | 1.84 | 1.61 |
| d29 | 23.02 | 18.78 | 0.20 |
| d35 | 28.44 | 13.25 | 2.67 |
| Entrance Pupil Position | 30.32 | 34.08 | 41.80 |
| Exit Pupil Position | −95.28 | −63.98 | −50.09 |
| Front Principal-Point Position | 44.81 | 51.70 | 64.49 |
| Rear Principal-Point Position | 24.14 | 18.21 | −4.36 |

LENS UNIT DATA

| Lens Unit | Starting Surface | Focal Length | Lens Construction Length | Front Principal-Point Position | Rear Principal-Point Position |
|---|---|---|---|---|---|
| 1 | 1 | 38.96 | 100.29 | 53.47 | 80.33 |
| 2 | 19 | −26.22 | 18.69 | 7.74 | −5.48 |
| 3 | 28 | 146.37 | 2.71 | 0.92 | −0.90 |
| 4 | 30 | 99.52 | 17.56 | −0.07 | −12.19 |
| 5 | 36 | 75.13 | 54.18 | −10.73 | −45.80 |

Single lens data

| Lens | Starting Surface | Focal Length |
|---|---|---|
| 1(G1) | 1 | −49.64 |
| 2 | 3 | −263.37 |
| 3 | 5 | −71.95 |
| 4 | 7 | −73.22 |
| 5(Gp) | 8 | 74.43 |
| 6 | 10 | 130.02 |
| 7 | 12 | 250.91 |
| 8 | 14 | −100.91 |
| 9 | 15 | 74.85 |
| 10 | 17 | 108.97 |
| 11 | 19 | −85.05 |
| 12 | 21 | −56.84 |
| 13 | 23 | 38.72 |
| 14 | 24 | −110.02 |
| 15 | 26 | −43.71 |
| 16 | 28 | 146.37 |
| 17 | 31 | 42.19 |
| 18 | 33 | 79.58 |
| 19 | 34 | −36.19 |
| 20 | 36 | 227.84 |
| 21 | 38 | −222.21 |
| 22 | 39 | 49.90 |
| 23 | 41 | 49.84 |
| 24 | 42 | −19.80 |
| 25 | 44 | 35.31 |
| 26 | 45 | −60.50 |
| 27 | 47 | −54.68 |
| 28 | 48 | 43.27 |

Numerical Example 5

UNIT: mm

SURFACE DATA

| Surface No. | r | d | nd | νd | θgf | Effective Diameter |
|---|---|---|---|---|---|---|
| 1* | 126.921 | 2.40 | 1.76385 | 48.5 | 0.5589 | 70.48 |
| 2 | 24.756 | 18.01 | | | | 47.75 |
| 3 | 205.334 | 1.60 | 2.00100 | 29.1 | 0.5997 | 46.22 |
| 4 | 31.331 | 16.61 | | | | 40.59 |
| 5 | −28.826 | 1.50 | 1.88300 | 40.8 | 0.5667 | 40.69 |
| 6 | −38.396 | 3.89 | | | | 43.56 |
| 7 | 362.828 | 5.91 | 1.89286 | 20.4 | 0.6393 | 50.00 |
| 8 | −99.897 | 4.53 | | | | 50.39 |
| 9 | 79.733 | 9.49 | 1.61800 | 63.3 | 0.5441 | 50.07 |
| 10* | −98.509 | 4.47 | | | | 49.78 |
| 11 | 462.544 | 8.59 | 1.49700 | 81.5 | 0.5375 | 46.73 |
| 12 | −52.417 | 0.20 | | | | 45.93 |
| 13 | −51.044 | 1.80 | 1.76385 | 48.5 | 0.5589 | 45.86 |
| 14 | −59.895 | 0.20 | | | | 45.65 |
| 15 | −92.715 | 1.65 | 1.95375 | 32.3 | 0.5905 | 43.69 |
| 16 | 50.357 | 11.35 | 1.43875 | 94.9 | 0.5340 | 42.17 |
| 17 | −52.496 | 0.20 | | | | 42.39 |
| 18 | 329.681 | 6.39 | 1.76385 | 48.5 | 0.5589 | 42.77 |
| 19 | −86.347 | (Variable) | | | | 42.81 |
| 20* | 463.639 | 1.20 | 1.90525 | 35.0 | 0.5848 | 27.55 |
| 21 | 40.082 | 3.64 | | | | 25.69 |
| 22 | −250.829 | 0.80 | 1.59522 | 67.7 | 0.5442 | 24.98 |
| 23 | 72.439 | 4.04 | 1.85478 | 24.8 | 0.6122 | 24.31 |
| 24 | −64.263 | 1.25 | | | | 23.70 |
| 25 | −33.758 | 0.80 | 1.76385 | 48.5 | 0.5589 | 23.43 |
| 26 | −151.628 | (Variable) | | | | 23.78 |
| 27 | −62.341 | 0.80 | 1.60300 | 65.4 | 0.5401 | 24.05 |
| 28 | 36.556 | 2.38 | 1.85478 | 24.8 | 0.6122 | 25.09 |
| 29 | 65.408 | (Variable) | | | | 25.24 |
| 30(SP) | ∞ | 3.19 | | | | 26.88 |
| 31* | 25.857 | 8.14 | 1.58144 | 40.8 | 0.5774 | 31.37 |
| 32 | −79.991 | 0.20 | | | | 31.17 |
| 33 | 72.746 | 6.52 | 1.78472 | 25.7 | 0.6161 | 29.85 |
| 34 | −36.630 | 0.90 | 2.00069 | 25.5 | 0.6136 | 29.04 |
| 35 | 39.449 | (Variable) | | | | 27.39 |
| 36 | 793.020 | 3.49 | 1.56732 | 42.8 | 0.5731 | 28.43 |
| 37 | −55.886 | 0.20 | | | | 28.63 |
| 38 | 44.558 | 1.00 | 2.05090 | 26.9 | 0.6054 | 28.21 |
| 39 | 28.061 | 3.94 | 1.53775 | 74.7 | 0.5392 | 27.34 |
| 40 | 84.241 | 40.06 | | | | 27.11 |
| 41 | 48.281 | 8.81 | 1.55200 | 70.7 | 0.5421 | 37.73 |
| 42 | −60.818 | 0.40 | | | | 37.50 |
| 43 | 51.915 | 6.05 | 1.80810 | 22.8 | 0.6307 | 33.90 |
| 44 | −84.930 | 1.10 | 1.88300 | 40.8 | 0.5667 | 32.89 |
| 45 | 32.067 | 2.44 | | | | 29.24 |
| 46 | 68.206 | 10.30 | 1.43875 | 94.7 | 0.5340 | 29.14 |
| 47 | −20.155 | 1.50 | 2.05090 | 26.9 | 0.6054 | 28.29 |
| 48 | −886.515 | 3.11 | | | | 31.02 |
| 49 | 76.996 | 9.29 | 1.48749 | 70.2 | 0.5300 | 35.18 |
| 50 | −32.448 | 37.00 | | | | 35.79 |
| Image Plane | ∞ | | | | | |

ASPHERIC DATA

1st Surface
K = 0.00000e+00 A 4 = 7.30634e−06 A 6 = −7.54574e−09 A 8 = 8.65243e−12
A10 = −4.83724e−15 A12 = 2.60356e−19 A14 = 1.10034e−21 A16 = −3.45510e−25
10th Surface
K = 0.00000e+00 A 4 = 1.72912e−06 A 6 = −5.37259e−10 A 8 = 1.75411e−13
20th Surface
K = 0.00000e+00 A 4 = 3.88741e−06 A 6 = −5.31069e−09 A 8 = 7.99823e−11
A10 = −4.60328e−13 A12 = 9.77729e−16
31st Surface
K = 0.00000e+00 A 4 = −1.08698e−05 A 6 = −8.27919e−10 A 8 = −1.03830e−11

-continued

UNIT: mm

VARIOUS DATA
MAGNIFICATION VARYING RATIO 3.85

| | WIDE | MIDDLE | TELE |
|---|---|---|---|
| Focal Length | 10.40 | 18.86 | 40.02 |
| Fno | 2.89 | 2.89 | 3.61 |
| Half Angle of View (°) | 54.91 | 38.12 | 20.30 |
| Image Height | 14.80 | 14.80 | 14.80 |
| Overall Lens Length | 320.72 | 320.72 | 320.72 |
| BF | 37.00 | 37.00 | 37.00 |
| d19 | 1.00 | 27.80 | 52.53 |
| d26 | 35.34 | 11.78 | 2.23 |
| d29 | 6.01 | 7.29 | 0.99 |
| d35 | 17.03 | 12.52 | 3.63 |
| Entrance Pupil Position | 25.23 | 28.56 | 33.80 |
| Exit Pupil Position | 2418.18 | −1423.06 | −346.31 |
| Front Principal-Point Position | 35.67 | 47.18 | 69.65 |
| Rear Principal-Point Position | 26.60 | 18.13 | −3.02 |

LENS UNIT DATA

| Lens Unit | Starting Surface | Focal Length | Lens Construction Length | Front Principal-Point Position | Rear Principal-Point Position |
|---|---|---|---|---|---|
| 1 | 1 | 29.16 | 98.79 | 44.15 | 79.54 |
| 2 | 20 | −41.45 | 11.73 | 2.27 | −6.07 |
| 3 | 27 | −62.78 | 3.18 | 1.24 | −0.52 |
| 4 | 30 | 63.68 | 18.96 | −8.67 | −17.65 |
| 5 | 36 | 63.55 | 91.69 | 38.16 | −65.64 |

Single lens data

| Lens | Starting Surface | Focal Length |
|---|---|---|
| 1(G1) | 1 | −40.68 |
| 2 | 3 | −37.11 |
| 3 | 5 | −141.36 |
| 4(Gp) | 7 | 88.26 |
| 5 | 9 | 72.78 |
| 6 | 11 | 95.26 |
| 7 | 13 | −495.88 |
| 8 | 15 | −34.02 |
| 9 | 16 | 60.62 |
| 10 | 18 | 90.18 |
| 11 | 20 | −48.53 |
| 12 | 22 | −94.34 |
| 13 | 23 | 40.39 |
| 14 | 25 | −57.02 |
| 15 | 27 | −38.10 |
| 16 | 28 | 93.41 |
| 17 | 31 | 34.59 |
| 18 | 33 | 31.88 |
| 19 | 34 | −18.87 |
| 20 | 36 | 92.16 |
| 21 | 38 | −74.44 |
| 22 | 39 | 76.38 |
| 23 | 41 | 50.20 |
| 24 | 43 | 40.68 |
| 25 | 44 | −26.25 |
| 26 | 46 | 36.77 |
| 27 | 47 | −19.64 |
| 28 | 49 | 48.17 |

Numerical Example 6

| UNIT: mm | | | | | | |
|---|---|---|---|---|---|---|
| SURFACE DATA | | | | | | |
| Surface No. | r | d | nd | νd | θgf | Effective Diameter |
| 1* | −651.846 | 2.50 | 1.83481 | 42.7 | 0.5648 | 80.83 |
| 2 | 29.886 | 17.96 | | | | 54.93 |
| 3* | 205.029 | 2.00 | 1.83481 | 42.7 | 0.5648 | 54.39 |
| 4 | 133.762 | 8.37 | | | | 53.04 |
| 5 | −93.844 | 1.80 | 1.83481 | 42.7 | 0.5648 | 52.38 |
| 6 | −529.040 | 0.15 | | | | 52.82 |
| 7 | 94.300 | 3.70 | 1.92286 | 18.9 | 0.6495 | 53.20 |
| 8 | 254.951 | 1.67 | | | | 52.90 |
| 9 | 137.316 | 7.43 | 1.60300 | 65.4 | 0.5401 | 52.15 |
| 10* | −129.387 | 4.41 | | | | 51.25 |
| 11 | −3986.720 | 6.22 | 1.43387 | 95.1 | 0.5373 | 51.04 |
| 12 | −72.185 | 0.30 | | | | 51.43 |
| 13 | −68.763 | 1.70 | 1.80000 | 29.8 | 0.6017 | 51.43 |
| 14 | −129.110 | 0.18 | | | | 52.89 |
| 15 | 177.001 | 1.70 | 1.91650 | 31.6 | 0.5911 | 54.56 |
| 16 | 53.973 | 15.73 | 1.43875 | 94.7 | 0.5340 | 54.69 |
| 17 | −72.950 | 0.40 | | | | 55.94 |
| 18 | 145.677 | 9.06 | 1.43387 | 95.1 | 0.5373 | 58.68 |
| 19 | −98.739 | 0.40 | | | | 58.81 |
| 20 | 198.764 | 6.83 | 1.76385 | 48.5 | 0.5589 | 57.74 |
| 21 | −143.417 | (Variable) | | | | 57.35 |
| 22 | 109.025 | 0.70 | 2.00100 | 29.1 | 0.5997 | 20.35 |
| 23 | 17.638 | 3.22 | | | | 18.16 |
| 24 | −147.134 | 0.70 | 1.43875 | 94.7 | 0.5340 | 17.98 |
| 25 | 52.607 | 2.33 | | | | 17.53 |
| 26 | −222.929 | 5.23 | 1.85478 | 24.8 | 0.6122 | 17.21 |
| 27 | −13.213 | 0.70 | 1.88300 | 40.8 | 0.5667 | 17.04 |
| 28 | 124.147 | 0.21 | | | | 17.90 |
| 29 | 32.929 | 2.64 | 1.64769 | 33.8 | 0.5938 | 18.56 |
| 30 | 640.048 | (Variable) | | | | 18.66 |
| 31 | −29.435 | 0.80 | 1.72916 | 54.7 | 0.5444 | 18.90 |
| 32 | 42.341 | 2.57 | 1.84666 | 23.8 | 0.6205 | 20.20 |
| 33 | 558.323 | (Variable) | | | | 20.64 |
| 34(SP) | ∞ | 1.20 | | | | 27.23 |
| 35* | 66.693 | 6.40 | 1.59522 | 67.7 | 0.5442 | 28.92 |
| 36 | −55.306 | 0.20 | | | | 29.53 |
| 37 | 129.439 | 6.58 | 1.53172 | 48.8 | 0.5631 | 29.55 |
| 38 | −31.398 | 1.00 | 1.88300 | 40.8 | 0.5667 | 29.40 |
| 39 | −87.887 | (Variable) | | | | 29.86 |
| 40 | 65.836 | 5.42 | 1.63980 | 34.5 | 0.5922 | 27.58 |
| 41 | −55.379 | 3.39 | | | | 27.13 |
| 42 | −71.478 | 0.90 | 1.88300 | 40.8 | 0.5667 | 24.95 |
| 43 | 30.858 | 5.07 | 1.48749 | 70.2 | 0.5300 | 24.66 |
| 44 | −107.443 | 0.20 | | | | 24.93 |
| 45 | 51.336 | 7.84 | 1.43875 | 94.7 | 0.5340 | 25.21 |
| 46 | −21.995 | 0.90 | 2.00100 | 29.1 | 0.5997 | 25.04 |
| 47 | −59.375 | 0.13 | | | | 26.13 |
| 48 | 92.546 | 5.49 | 1.48749 | 70.2 | 0.5300 | 26.63 |
| 49 | −34.223 | 3.27 | | | | 26.70 |
| 50 | ∞ | 33.00 | 1.60859 | 46.4 | 0.5664 | 40.00 |
| 51 | ∞ | 13.20 | 1.51680 | 64.2 | 0.5347 | 40.00 |
| 52 | ∞ | 6.60 | | | | 40.00 |
| Image Plane | ∞ | | | | | |

ASPHERIC DATA

1st Surface
K = 0.00000e+00 A 4 = 6.48442e−06 A 6 = 2.19226e−09 A 8 = 6.50797e−12
A10 = 8.92330e−14 A12 = 1.11240e−16 A14 = 1.77070e−20 A16 = 3.15292e−25
A 3 = 8.54799e−06 A 5 = −1.41802e−07 A 7 = −4.53639e−11 A 9 = −1.10620e−12
A11 = −4.05612e−15 A13 = −1.83948e−18 A15 = −9.72378e−23
3rd Surface
K = 0.00000e+00 A 4 = −3.35608e−06 A 6 = −7.00472e−08 A 8 = −7.37142e−10
A10 = −3.24129e−13 A12 = 1.58966e−15 A14 = −6.55545e−19 A16 = −2.03600e−22
A 3 = −8.90697e−07 A 5 = 3.79740e−07 A 7 = 9.30814e−09 A 9 = 3.11630e−11
A11 = −3.28771e−14 A13 = −1.76087e−17 A15 = 2.23720e−20

-continued

| UNIT: mm |
|---|
| 10th Surface<br>K = 0.00000e+00 A 4 = 1.29716e−06 A 6 = 1.84566e−08 A 8 = 2.81340e−10<br>A10 = 2.05135e−13 A12 = −7.68327e−16 A14 = 1.04059e−18 A16 = 2.18082e−22<br>A 3 = 3.31773e−07 A 5 = −5.38599e−08 A 7 = −2.96537e−09 A 9 = −1.45178e−11<br>A11 = 1.68411e−14 A13 = −4.57121e−18 A15 = −2.62172e−20<br>35th Surface<br>K = 6.60773e+00 A 4 = −4.74213e−06 A 6 = −9.99912e−11 A 8 = −7.56379e−12 |

VARIOUS DATA
MAGNIFICATION VARYING RATIO 15.32

| | WIDE | MIDDLE | TELE |
|---|---|---|---|
| Focal Length | 4.26 | 15.50 | 65.32 |
| Fno | 1.87 | 1.86 | 3.05 |
| Half Angle of View (°) | 52.22 | 19.53 | 4.81 |
| Image Height | 5.50 | 5.50 | 5.50 |
| Overall Lens Length | 313.33 | 313.33 | 313.33 |
| BF | 6.60 | 6.60 | 6.60 |
| d21 | 0.47 | 36.42 | 53.16 |
| d30 | 39.91 | 5.86 | 3.67 |
| d33 | 14.99 | 17.75 | 2.07 |
| d39 | 45.53 | 40.87 | 42.01 |
| Entrance Pupil Position | 27.99 | 48.37 | 98.34 |
| Exit Pupil Position | 165.32 | 219.89 | 203.28 |
| Front Principal-Point Position | 32.37 | 65.00 | 185.35 |
| Rear Principal-Point Position | 2.33 | −8.91 | −58.73 |

LENS UNIT DATA

| Lens Unit | Starting Surface | Focal Length | Lens Construction Length | Front Principal-Point Position | Rear Principal-Point Position |
|---|---|---|---|---|---|
| 1 | 1 | 29.67 | 92.51 | 42.41 | 43.37 |
| 2 | 22 | −19.60 | 15.73 | −0.17 | −12.19 |
| 3 | 31 | −42.47 | 3.37 | 0.06 | −1.79 |
| 4 | 34 | 45.06 | 15.39 | 3.75 | −6.62 |
| 5 | 40 | 52.58 | 78.82 | 14.21 | −41.97 |

Single lens data

| Lens | Starting Surface | Focal Length |
|---|---|---|
| 1(G1) | 1 | −34.17 |
| 2 | 3 | −466.93 |
| 3 | 5 | −136.91 |
| 4(Gp) | 7 | 160.39 |
| 5 | 9 | 111.65 |
| 6 | 11 | 169.36 |
| 7 | 13 | −186.23 |
| 8 | 15 | −85.29 |
| 9 | 16 | 73.48 |
| 10 | 18 | 137.18 |
| 11 | 20 | 110.01 |
| 12 | 22 | −21.10 |
| 13 | 24 | −88.23 |
| 14 | 26 | 16.25 |
| 15 | 27 | −13.49 |
| 16 | 29 | 53.51 |
| 17 | 31 | −23.70 |
| 18 | 32 | 53.99 |
| 19 | 35 | 51.81 |
| 20 | 37 | 48.21 |
| 21 | 38 | −55.78 |
| 22 | 40 | 47.85 |
| 23 | 42 | −24.31 |
| 24 | 43 | 49.77 |
| 25 | 45 | 36.28 |
| 26 | 46 | −35.33 |
| 27 | 48 | 51.99 |

TABLE 1

| Inequality | | Numerical Example | | | | | |
|---|---|---|---|---|---|---|---|
| | | 1 | 2 | 3 | 4 | 5 | 6 |
| (1-1) | (f1 + bok1)/f1 | 2.435 | 2.473 | 2.894 | 3.062 | 3.728 | |
| (1-2) | ft/f1 | 2.420 | 2.287 | 2.049 | 1.155 | 1.372 | |
| (3) | f1/fw | 6.327 | 6.694 | 2.377 | 2.361 | 2.804 | |
| (4) | ft/fG1 | −1.857 | −1.811 | −1.694 | −0.907 | −0.984 | |
| (5) | ft/fGp | 2.901 | 2.849 | 1.448 | 1.654 | 2.205 | |
| (6) | f1a/f1 | −1.02 | −1.01 | −0.96 | −0.98 | −0.76 | |
| (7) | f1b/f1 | 4.05 | 3.84 | 3.25 | 6.44 | 2.50 | |
| (8) | f1c/f1 | 1.70 | 1.76 | 2.75 | 1.94 | 3.70 | |
| (9) | LD1/f1 | 3.61 | 3.24 | 3.63 | 2.57 | 3.39 | |
| (10) | ωw | 52.189 | 52.212 | 52.648 | 52.667 | 54.906 | |
| (11) | Fnow | 1.872 | 1.872 | 2.727 | 2.749 | 2.893 | |
| (12) | fw/BFw | 0.074 | 0.076 | 0.305 | 0.375 | 0.281 | |
| (13) | LDs/LT | 0.509 | 0.529 | 0.477 | 0.511 | 0.487 | |
| (14) | nd1n | 1.773 | 1.773 | 1.779 | 1.773 | 1.782 | |
| (15) | νd1ap | 18.90 | 17.47 | 20.36 | 25.46 | 20.36 | |
| (1-2) | (f1 + bok1)/f1 | 2.435 | 2.473 | 2.894 | | | 2.462 |
| (2-2) | ft/f1 | 2.420 | 2.287 | 2.049 | | | 2.202 |
| (4) | ft/fG1 | −1.857 | −1.811 | −1.694 | | | −1.912 |
| (5) | ft/fGp | 2.901 | 2.849 | 1.448 | | | 2.455 |
| (6) | f1a/f1 | −1.02 | −1.01 | −0.96 | | | −0.97 |
| (7) | f1b/f1 | 4.05 | 3.84 | 3.25 | | | 3.76 |
| (8) | f1c/f1 | 1.70 | 1.76 | 2.75 | | | 1.75 |
| (9) | LD1/f1 | 3.61 | 3.24 | 3.63 | | | 3.12 |
| (10) | ωw | 52.189 | 52.212 | 52.648 | | | 52.221 |
| (11) | Fnow | 1.872 | 1.872 | 2.727 | | | 1.866 |
| (12) | fw/BFw | 0.074 | 0.076 | 0.305 | | | 0.076 |
| (13) | LDs/LT | 0.509 | 0.529 | 0.477 | | | 0.533 |
| (14) | nd1n | 1.773 | 1.773 | 1.779 | | | 1.773 |
| (15) | νd1ap | 18.90 | 17.47 | 20.36 | | | 18.90 |

Image Pickup Apparatus

FIG. 13 illustrates the configuration of an image pickup apparatus 125 that uses one of the zoom lenses according to Examples 1 to 6 as an imaging optical system. Reference numeral 101 denotes one of the zoom lenses according to Examples 1 to 6. Reference numeral 124 denotes a camera body. The zoom lens 101 is attached to and detachable from the camera body 124. The zoom lens may be integrated with the camera body.

The zoom lens 101 includes a first lens unit F, three or more intermediate lens units LZ that move for zooming, and a rear lens unit R for imaging. The first lens unit F includes a second sub-lens unit that moves for focusing, and a first sub-lens unit and a third sub-lens unit that do not move for focusing. The zoom lens 101 further includes an aperture stop SP.

Reference numerals 114 and 115 denote drive mechanisms that drive the second sub-lens unit and three or more intermediate lens units LZ, respectively. Each drive mechanism includes a helicoid, a cam, and the like.

Reference numerals 116 to 118 denote motors that drive the drive mechanisms 114 and 115 and the aperture stop SP, respectively. Reference numerals 119 to 121 are detectors configured to detect the positions of the second sub-lens unit and intermediate lens unit LZ on the optical axis and the aperture diameter of the aperture stop SP, respectively. Each detector includes an encoder, a potentiometer, a photosensor, and the like.

In the camera body 124, reference numeral 109 denotes a glass block containing an optical filter, etc., and reference numeral 110 denotes an image sensor (photoelectric conversion element) such as a CCD sensor or CMOS sensor that images an object through the zoom lens 101. Reference numerals 111 and 122 denote a CPU serving as a processing unit in the camera body 124 and a CPU serving as a processing unit in the zoom lens 101, respectively.

The image pickup apparatus using the zoom lens according to each example can capture an image using a structure having a reduced size and weight, a wide angle of view, and a high magnification varying ratio, and can obtain a captured image with excellent image quality.

While the disclosure has described example examples, it is to be understood that some examples are not limited to the disclosed embodiments. The scope of the following claims is to be accorded the broadest interpretation so as to encompass all such modifications and equivalent structures and functions.

Each example can provide a zoom lens having a reduced size and weight, high optical performance, a wide angle of view, and a high magnification varying ratio.

This application claims priority to Japanese Patent Application No. 2023-110443, which was filed on Jul. 5, 2023, and which is hereby incorporated by reference herein in its entirety.

What is claimed is:

1. A zoom lens comprising, in order from an object side to an image side:

a first lens unit having positive refractive power that does not move for zooming;

three or more intermediate lens units that move for zooming; and a rear lens unit having positive refractive power, wherein a distance between adjacent lens units changes during zooming, wherein the first lens unit includes, in order from the object side to the image side, a first sub-lens unit having negative refractive power that does not move for focusing, a second sub-lens unit having positive refractive power that moves for focusing, and a third sub-lens unit having positive refractive power, wherein the following inequalities are satisfied:

$$2.430 \leq (f1+bok1)/f1 \leq 4.500$$

$$1.150 \leq ft/f1 \leq 3.200$$

$$2.250 \leq f1/fw \leq 6.700$$

where f1 is a focal length of the first lens unit, bok1 is a length on an optical axis from a lens surface closest to an image plane of the first lens unit to a rear principal point of the first lens unit in an in-focus state on an infinity object, fw is a focal length of the zoom lens at a wide-angle end, and ft is a focal length of the zoom lens at a telephoto end, and wherein the zoom lens is used for an image pickup apparatus having an imaging surface with a diagonal size of 2Y, and the following inequality is satisfied:

$$51.50° \leq \omega w \leq 65.00°$$

where ωw is a half angle of the zoom lens at the wide-angle end and defined as:

$$\omega w = \arctan(Y/fw).$$

2. The zoom lens according to claim 1, wherein a negative lens is disposed closest to an object of the first lens unit, and the following inequality is satisfied:

$$-2.10 \leq ft/fG1 \leq -0.50$$

where fG1 is a focal length of the negative lens.

3. The zoom lens according to claim 1, wherein the first sub-lens unit includes a positive lens, and the following inequality is satisfied:

$$0.40 \leq ft/fGp \leq 10.60$$

where fGp is a focal length of the positive lens.

4. The zoom lens according to claim 1, wherein the following inequality is satisfied:

$$-1.50 \leq f1a/f1 \leq -0.60$$

where f1a is a focal length of the first sub-lens unit.

5. The zoom lens according to claim 1, wherein the following inequality is satisfied:

$$2.00 \leq f1b/f1 \leq 6.50$$

where f1b is a focal length of the second sub-lens unit.

6. The zoom lens according to claim 1, wherein the following inequality is satisfied:

$$1.30 \leq f1c/f1 \leq 4.50$$

where f1c is a focal length of the third sub-lens unit.

7. The zoom lens according to claim 1, wherein the following inequality is satisfied:

$$1.10 \leq LD1/f1 \leq 6.50$$

where LD1 is a thickness on the optical axis from a lens surface closest to an object to the lens surface closest to the image plane of the first lens unit.

8. The zoom lens according to claim 1, wherein the following inequality is satisfied:

$$1.30 \leq Fnow \leq 3.50$$

where Fnow is an F-number of the zoom lens at the wide-angle end.

9. The zoom lens according to claim 1, wherein the following inequality is satisfied:

$$0.050 \leq fw/BFw \leq 0.430$$

where BFw is a length on the optical axis from a lens surface on the image side of a lens closest to the image plane among lenses included in the zoom lens to the image plane.

10. The zoom lens according to claim 1, further comprising an aperture stop, wherein the following inequality is satisfied:

$$0.20 \leq LDs/LT \leq 0.60$$

where LDs is a length on the optical axis from a lens surface closest to an object of the first lens unit to the aperture stop in the in-focus state on the object at infinity and at the wide-angle end, and LT is a length on the optical axis from the lens surface closest to the object of the first lens unit to a lens surface closest to the image plane of the rear lens unit in the in-focus state on the object at infinity and at the wide-angle end.

11. The zoom lens according to claim 1, wherein the following inequality is satisfied:

$$1.750 \leq nd1n \leq 2.000$$

where nd1n is an average value of a refractive index for d-line of at least one negative lens included in the first lens unit.

12. The zoom lens according to claim 1, wherein the first sub-lens unit has a positive lens, and the following inequality is satisfied:

$$17.0 \leq \nu d1ap \leq 35.0$$

where νd1ap is an Abbe number of the positive lens based on d-line.

13. An image pickup apparatus comprising:

the zoom lens according to claim 1; and an image sensor configured to image an object through the zoom lens.

* * * * *